United States Patent Office 3,404,788
Patented Oct. 8, 1968

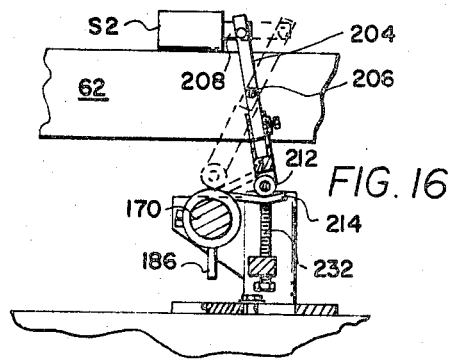
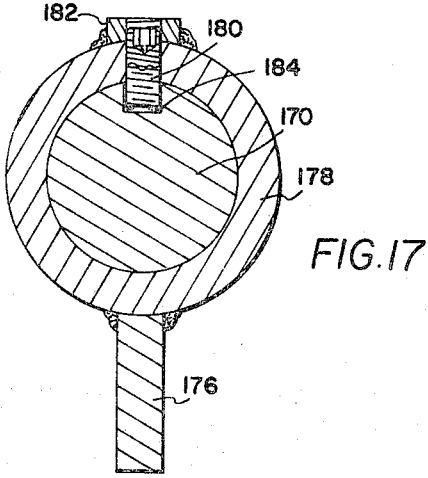
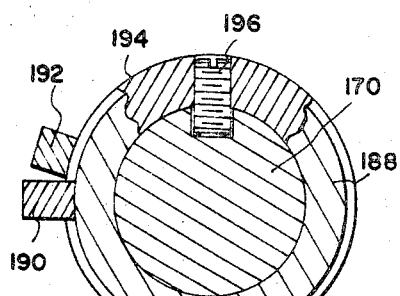
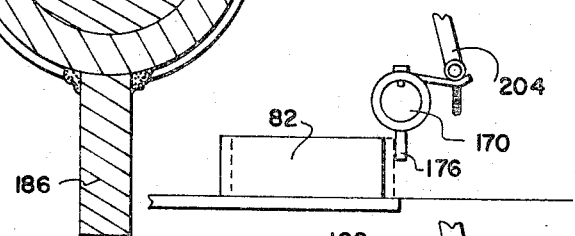
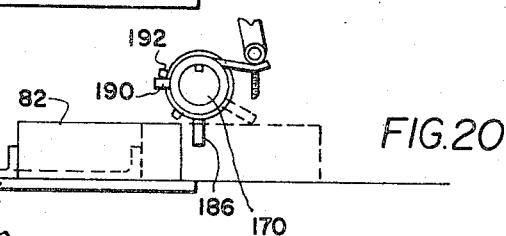
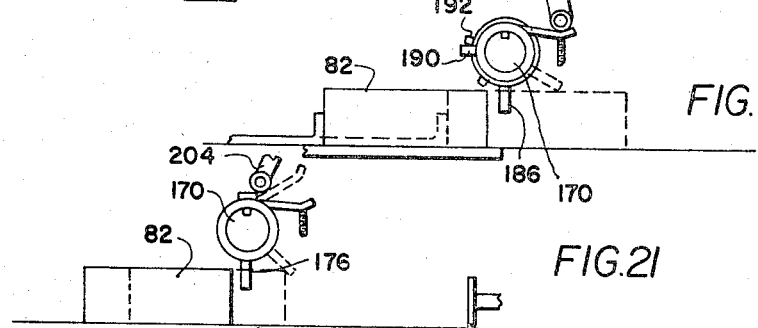
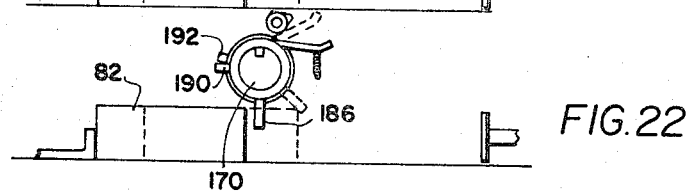

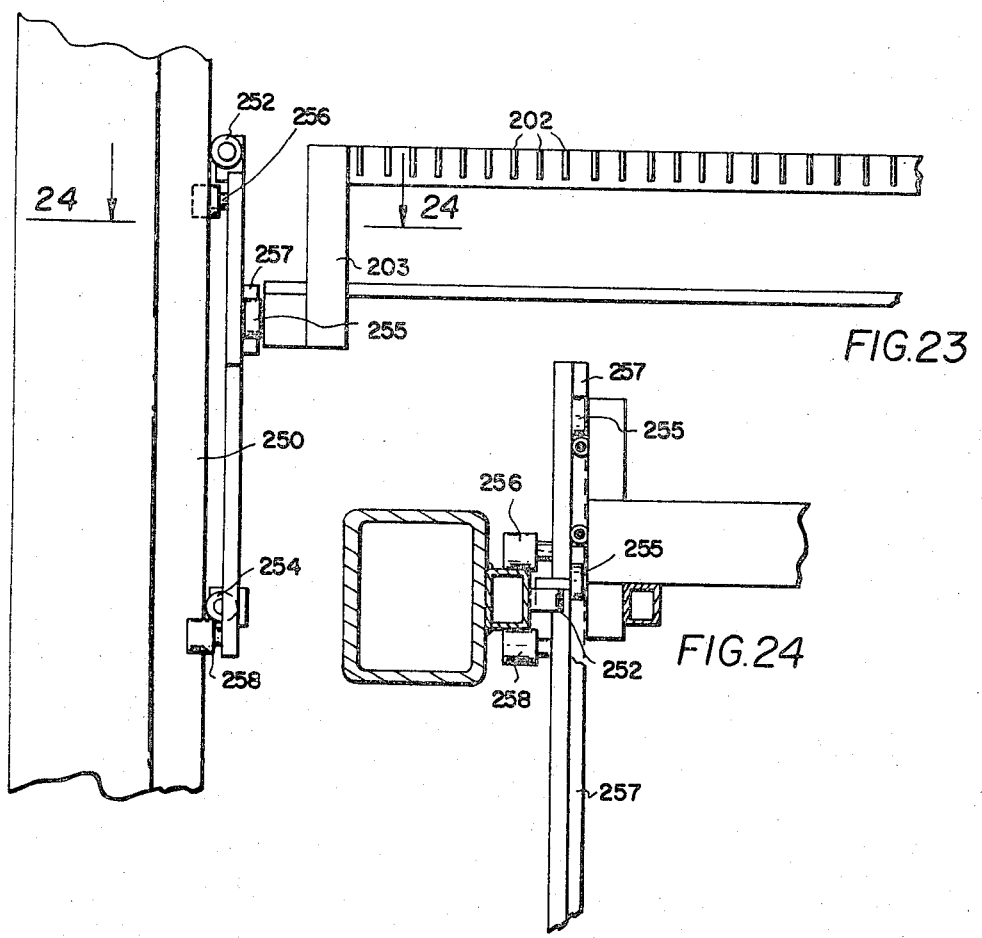
FIG. 23
FIG. 24
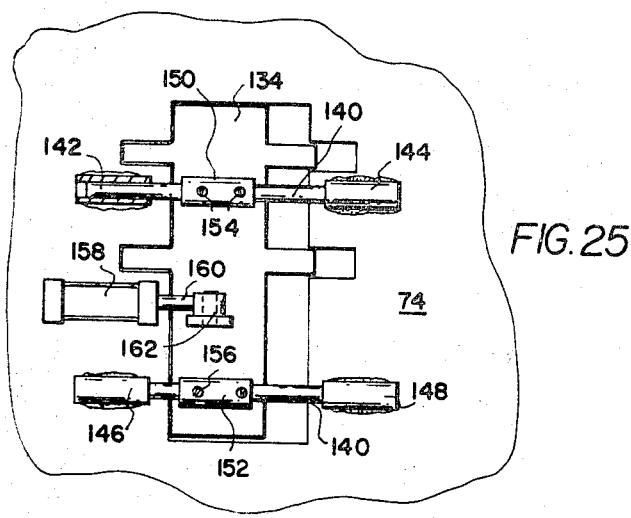
FIG. 25

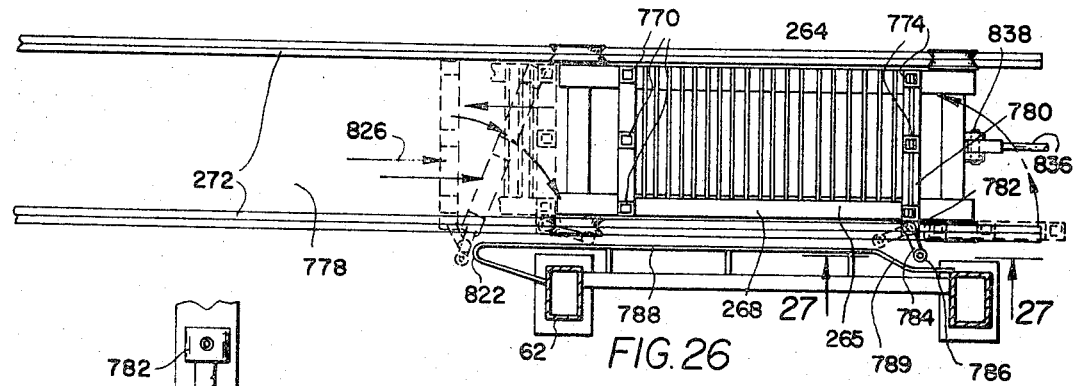
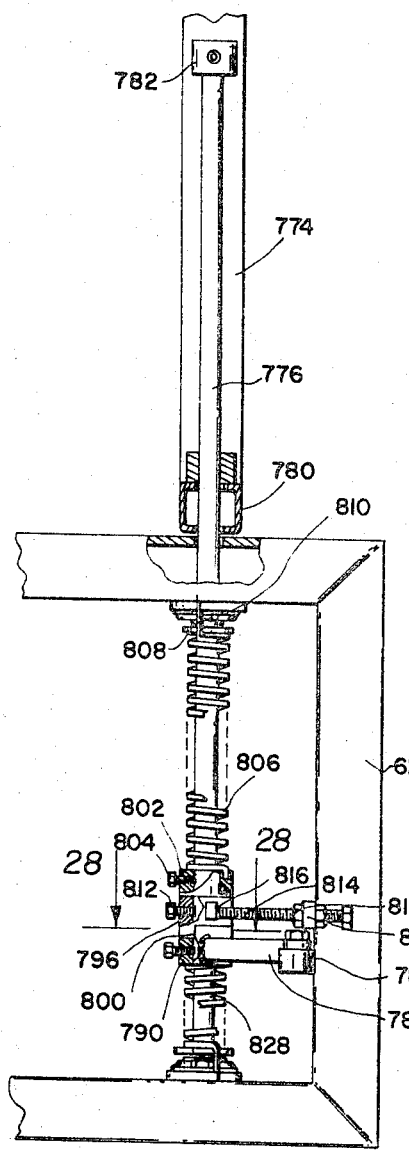
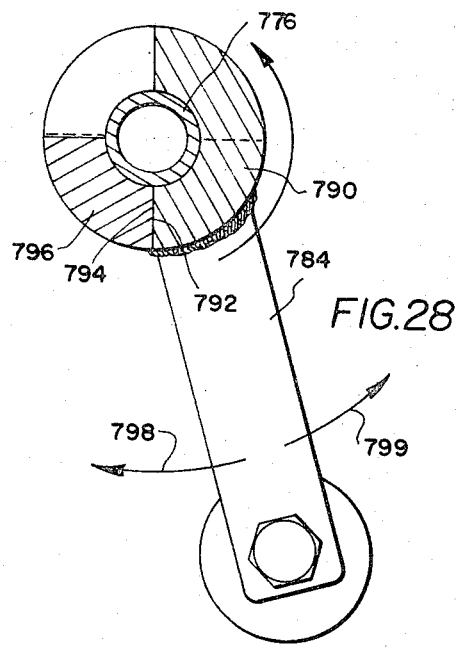

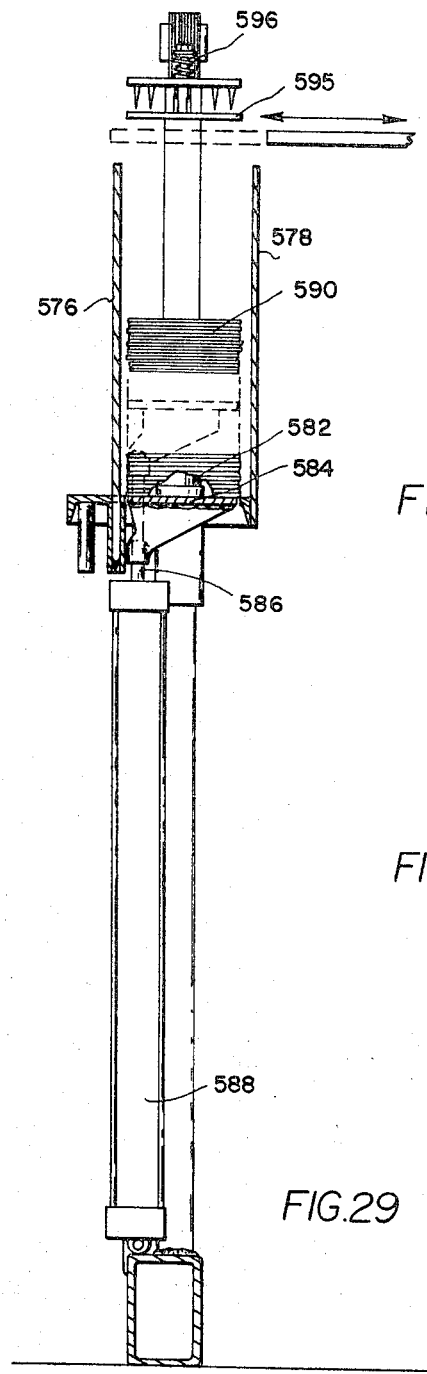
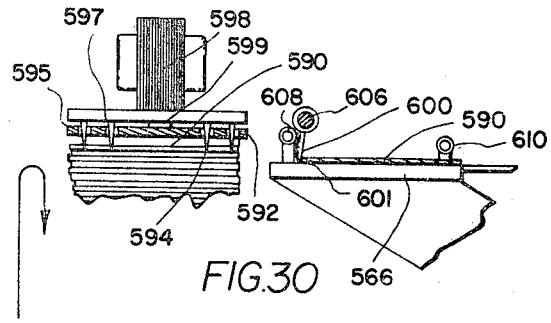
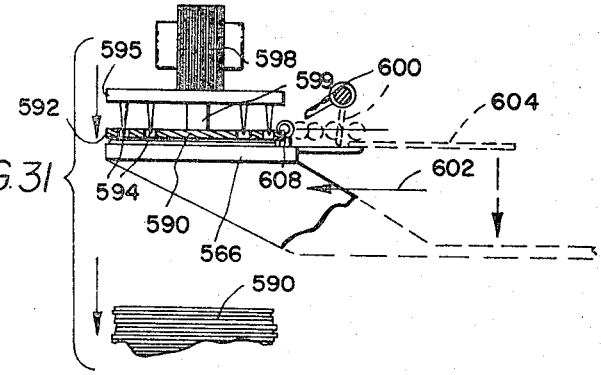
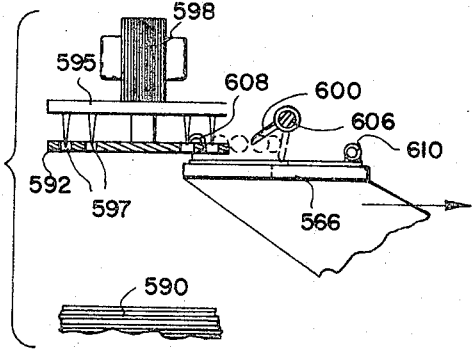

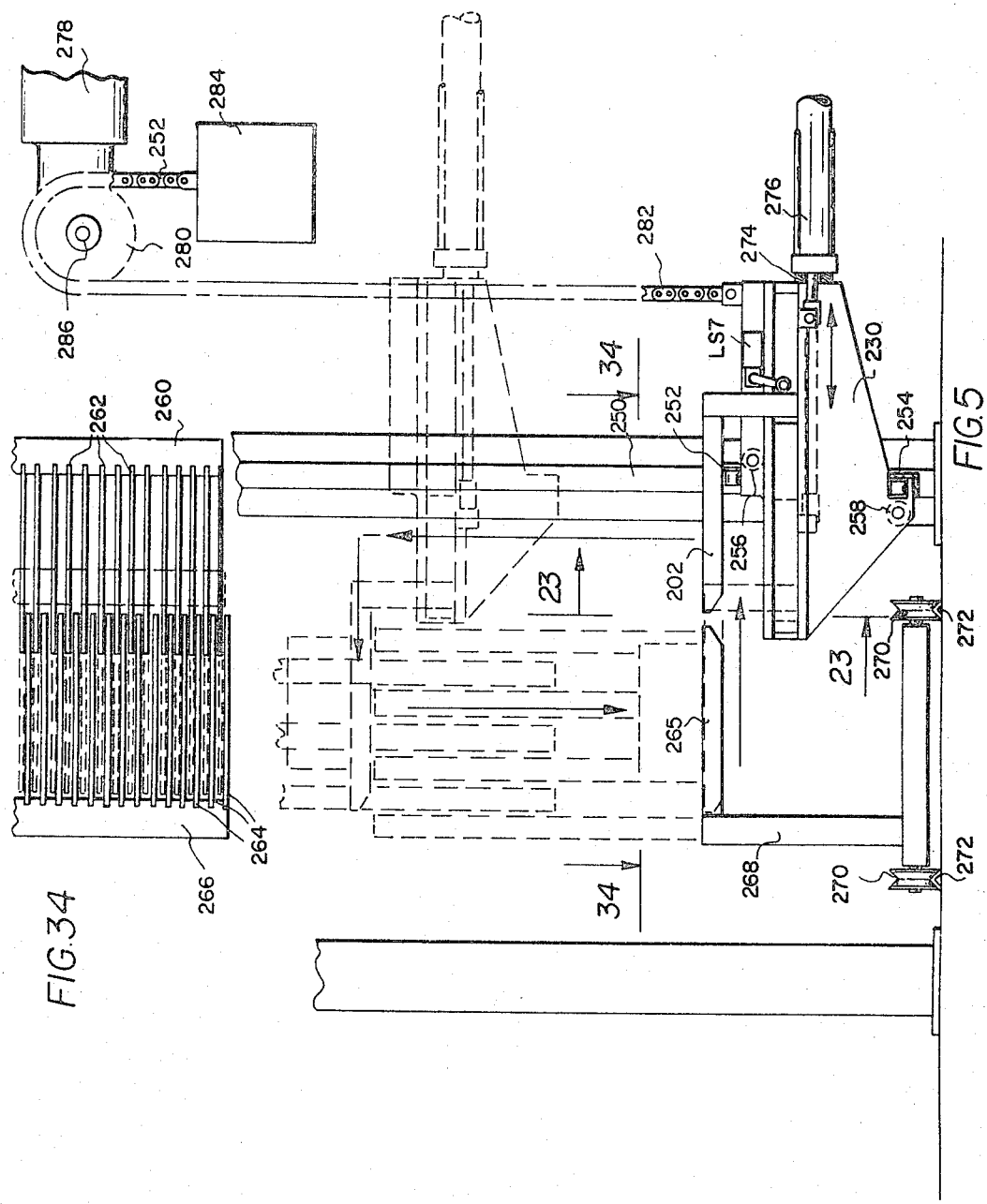

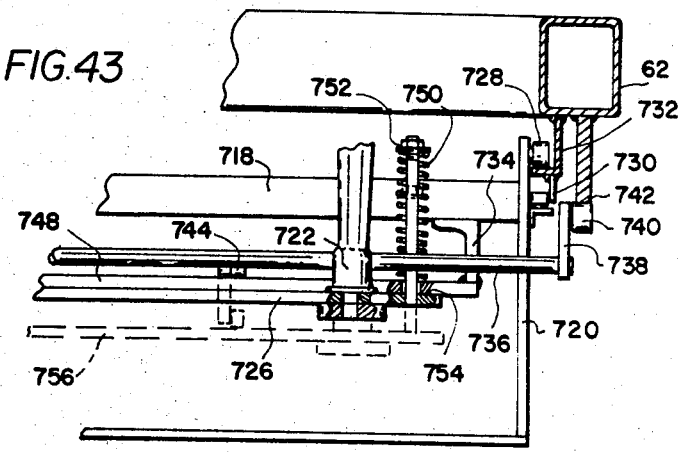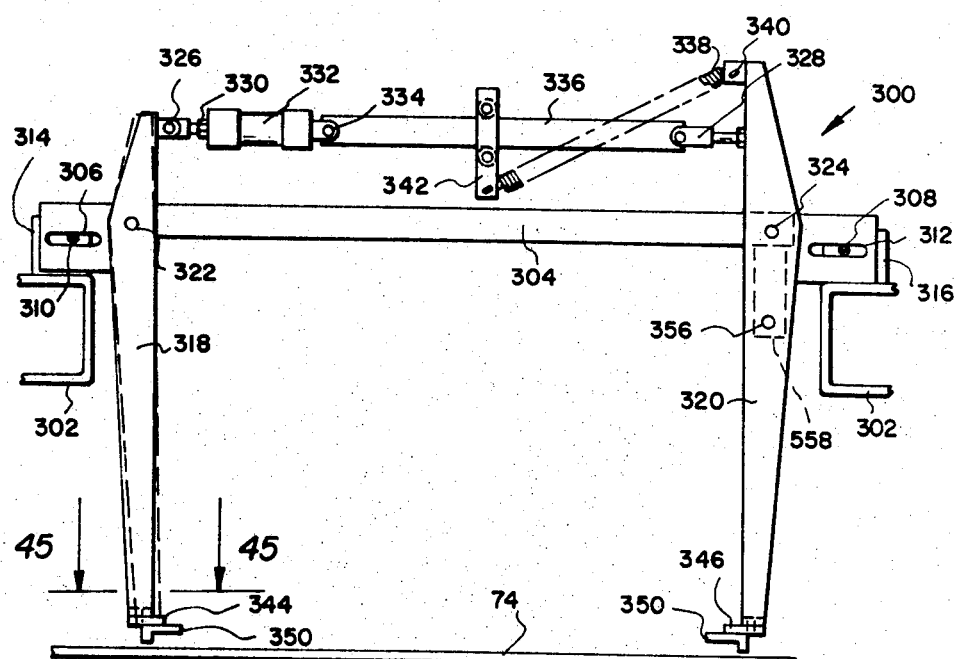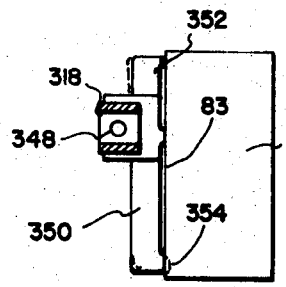

3,404,788
BRICK STACKING MACHINE
Paul M. Thomas, Phoenix, Robert H. Neill, Mesa, Lawrence W. Wright, Scottsdale, Eugene E. Crile, Phoenix, and Russell W. Burge, Glendale, Ariz., assignors to Builders Equipment Company, Glendale, Ariz., a corporation of Arizona
Filed Oct. 3, 1966, Ser. No. 583,591
19 Claims. (Cl. 214—6)

This invention relates to a brick stacking machine, and more particularly, to a machine for stacking bricks preparatory to the bundling of stacks of bricks by a conventional strapping machine.

Heretofore, bricks have been stacked and bundled for convenience in handling them during the transport thereof from a production facility to areas in which masons use such bricks for construction work.

The handling of bundles of bricks has posed a problem in that these bundles are quite heavy and generally difficult to handle manually. Additionally, the mechanical handling of bricks has also posed some problems in that the corners and edges of bricks are readily chipped by careless handling and particularly with hard objects, such as usual mechanical lift trucks or fork lift devices. Additionally, conventional bundled stacks of bricks are relatively thin in one direction horizontally and are normally difficult to pick up from the bottom portion thereof without being tipped over and also in attempts to handle stacks of bricks in this manner, the lower bricks tend to become damaged at the edges and corners.

Accordingly, it is an object of the present invention to provide a brick stacking machine which automatically stacks bricks in a desired sized stack, while leaving out some of the bricks in the stack to provide voids or openings through the stacks for the insertion of mechanical lift forks so that the stacks may readily be impaled on such forks of lift trucks or carrying devices for conveniently picking up the stacks and transporting them or handling them, as desired, without using base pallets.

Another object of the invention is to provide a brick stacking machine which automatically stacks bricks in a conventional sized stack and leaves out or omits some of the bricks in one course of the stack to provide openings through the stack for the insertion of forks of a fork lift truck or handling device; and said machine also interposes a thin pallet between the courses of the bricks directly above the openings left by the omitted bricks in the stack so as to provide a bearing for the forks of a fork lift truck to protect the lower edges of the bricks directly above the openings in the stack, whereby the fork lift truck, when it engages the pallet, may pick up the stack of bricks, which is held together by a surrounding band.

Another object of the invention is to provide a brick stacking machine having novel means for interposing pallets and layers of paper between courses in stacks of bricks stacked by the machine.

Another object of the invention is to provide a novel conveyor, deck plate and gate means which, together with automatic controls, automatically deposits courses or rows of bricks, one upon the other, on a vertically incrementally moved elevator and whereby the gate means selectively omits certain bricks from one course in each stack to provide voids in the stacks for the insertion of handling forks or other handling means after the stack is completed and strapped.

Another object of the invention is to provide a novel brick stacking machine having a novel elevator and brick stack carriage, each of which are provided with platform means comprising a plurality of horizontally disposed spaced fingers, whereby the elevator platform fingers are aligned to pass between the carriage platform fingers so as to vertically unload stacks of bricks from the elevator platform to the carriage platform so that each successive stack of bricks may be transported out of the area of the elevator in order that it may successively produce or accumulate stacks of bricks.

Another object of the invention is to provide a novel combination of elevator and carriage platform mechanism, which permits vertical unloading of stacks of bricks from the elevator onto the carriage platform and also for maintaining stable disposition of the stack of bricks, when moved on the carriage platform preliminary to a conventional operation of surrounding the stack of bricks with a metal strap for holding the stack in proper assembly.

Another object of the invention is to provide a brick stacking machine adapted automatically to stack bricks in a conventional stack and wherein novel control means automatically controls the machine of the invention to stack bricks of different thickness and to provide a stack having maching handling openings therein provided in accordance with certain bricks which are automatically omitted from the stack by control means of the machine.

Another object of the invention is to provide a brick stacking machine having a novel deck plate and brick gate mechanism wherein a row of bricks is accumulated on the deck plate and moved through the gate mechanism in such a manner, that some of the bricks are withheld and others pass through the gate mechanism and whereby a shifting portion of a deck plate is capable of shifting the bricks laterally to compensate for bricks of different thicknesses when accumulating rows of bricks in a stack to properly form voids or machine handling openings in the stack when bricks of various thicknesses are employed in the formation of such a stack of bricks.

Further objects and advantages of the invention may be apparent from the following specification, appended claims and accompanying drawings, in which:

FIG. 5 is an enlarged fragmentary sectional view taken from the line 5—5 of FIG. 2, showing by broken lines, varying positions of the elevator and stack carriage of the machine of the invention;

FIG. 16 is an enlarged fragmentary sectional view taken from the line 16—16 of FIG. 3 and illustrating structure of the brick gate control mechanism of the invention;

FIG. 17 is an enlarged sectional view taken from line 17—17 of FIG. 3, showing details of the gate mechanism of the invention;

FIG. 18 is an enlarged sectional view taken from the line 18—18 of FIG. 3, showing details of the brick controlling gate mechanism of the invention and illustrating by broken lines, varying positions of parts thereof;

FIG. 19 is a diagrammatic view illustrating one mode of operation of the structure shown in FIG. 17;

FIG. 20 is a diagrammatic view showing a mode of operation of the mechanism shown in FIG. 18 concurrently with the mode of operation of the structure shown in FIG. 19;

FIG. 21 is a diagrammatic view of an additional mode of operation of the structure shown in FIG. 17;

FIG. 22 is an additional diagrammatic view showing a further mode of operation of the structure shown in FIG. 18 concurrently with the mode of operation of the structure shown in FIG. 21;

FIG. 23 is an enlarged fragmentary sectional view taken from the line 23—23 of FIG. 5;

FIG. 24 is a fragmentary sectional view taken from the line 24—24 of FIG. 23;

FIG. 25 is a fragmentary bottom plan view of the deck plate shifting mechanism taken from the line 25—25 of FIG. 4 and shown on slightly enlarged scale;

FIG. 26 is a plan sectional view taken from the line 26—26 of FIG. 2, showing a brick stack carriage and platform mechanism of the invention and illustrating by broken lines and arrows, varying positions of brick stack holding mechanism of the carriage;

FIG. 27 is an enlarged fragmentary sectional view taken from the line 27—27 of FIG. 26;

FIG. 28 is an enlarged plan sectional view taken from the line 28—28 of FIG. 27;

FIG. 29 is an enlarged fragmentary sectional view taken from the line 29—29 of FIG. 2, showing pallet magazine mechanism of the invention;

FIG. 30 is a diagrammatic view showing the operation of the pallet magazine and handling mechanism of the invention and illustrating such mechanism on slightly enlarged scale as compared to that of FIG. 29;

FIG. 31 is a similar view to FIG. 30, but showing a successive operation of pallet handling relative to that shown in FIG. 30;

FIG. 32 is another view similar to FIG. 30, but showing an operation which is successive to that, as shown in FIG. 31;

FIG. 34 is a plan sectional view taken from the line 34—34 of FIG. 5, showing a meshed relation of the fingers of the elevator platform and the brick stack platform of the stack carriage of the invention and showing a varying position of such mechanism from that, as shown in FIG. 5;

Figure 2:
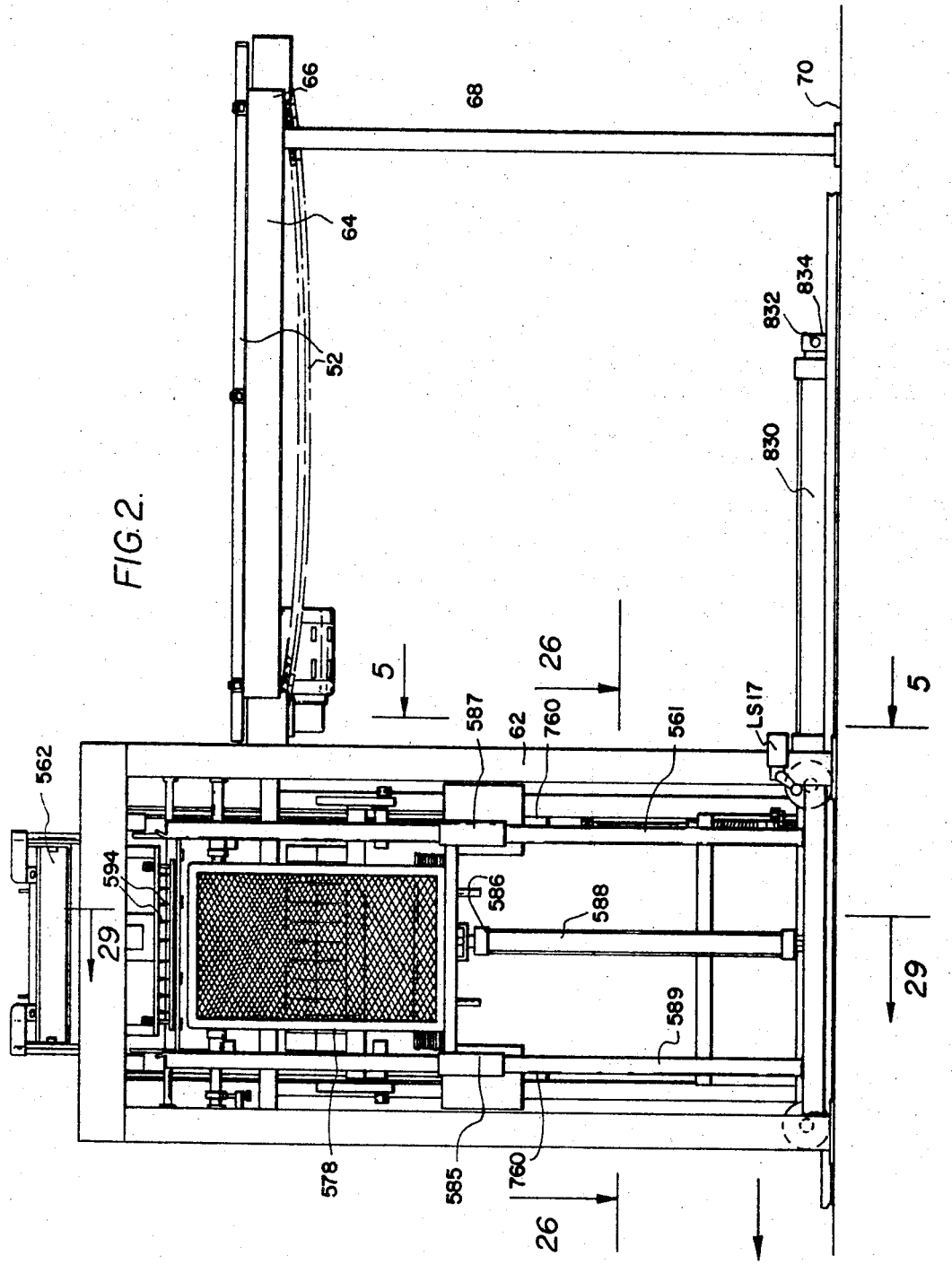
FIG. 2 is a side elevational view of the machine of the invention, taken from line 2—2 of FIG. 1.
Figure 4:
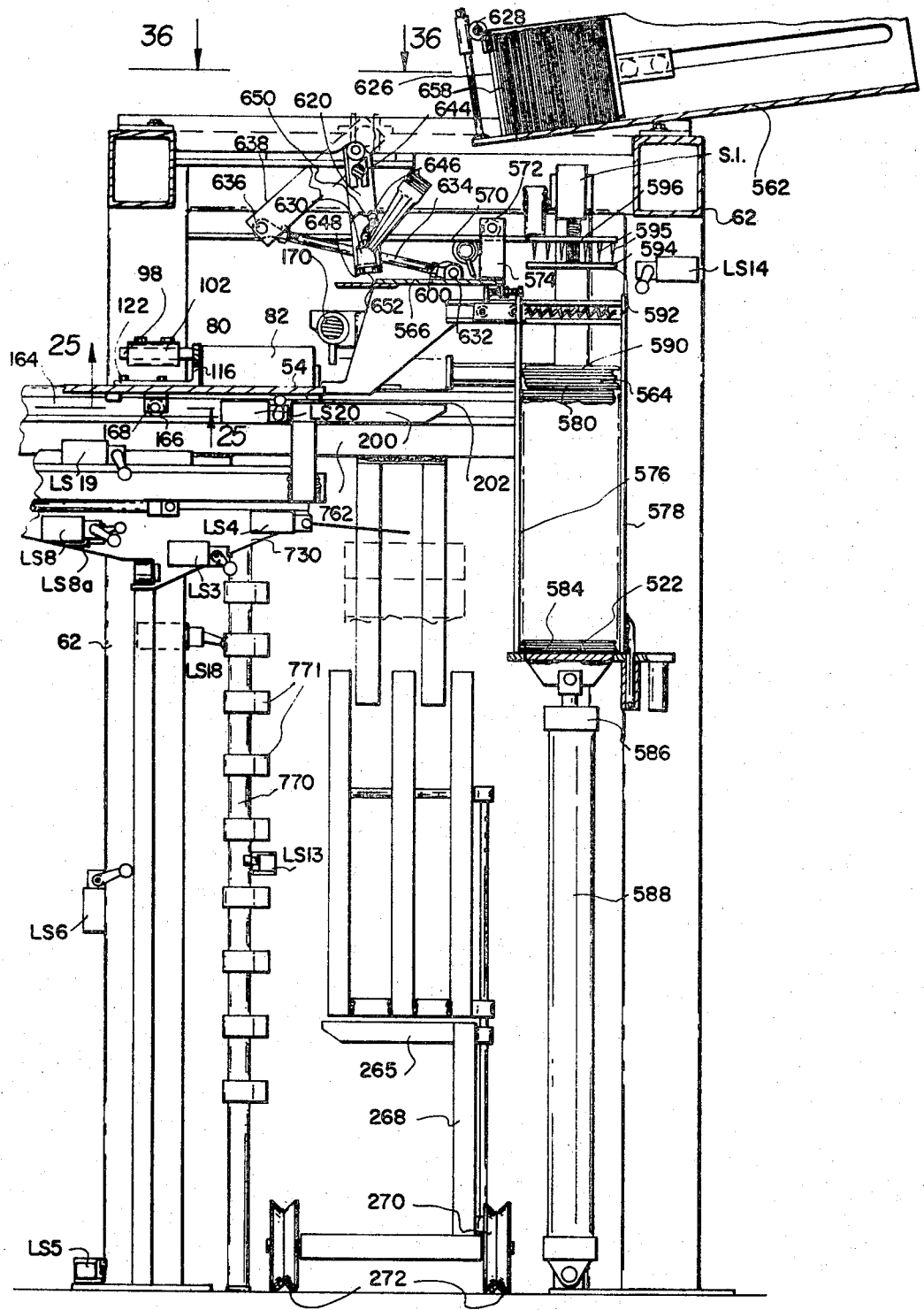
FIG. 4 is a fragmentary vertical sectional view taken from line 4—4 of FIG. 3, showing the structure on slightly reduced scale.
Figure 35:
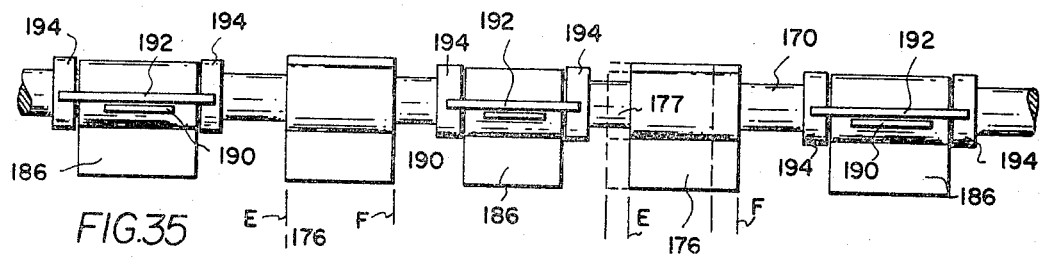
FIG. 35 is an enlarged sectional view taken from the line 35—35 of FIG. 3, showing a relationship of the brick gate mechanism of the invention to the various brick thicknesses and stacked relationships illustrated in the diagrammatic view of FIG. 33.
Figure 39:
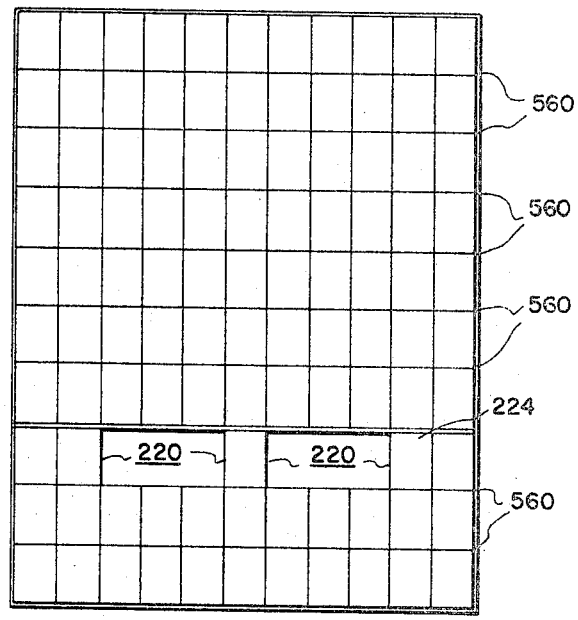
Figure 40:
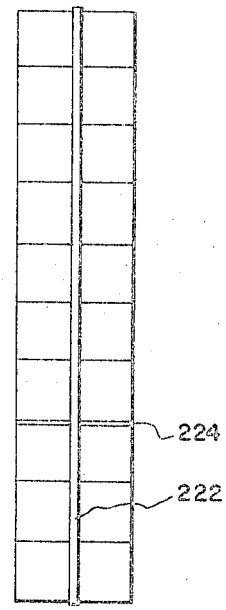
Figure 41:
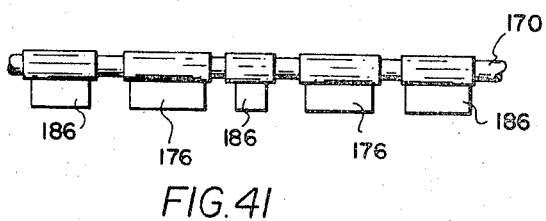
Figure 42:
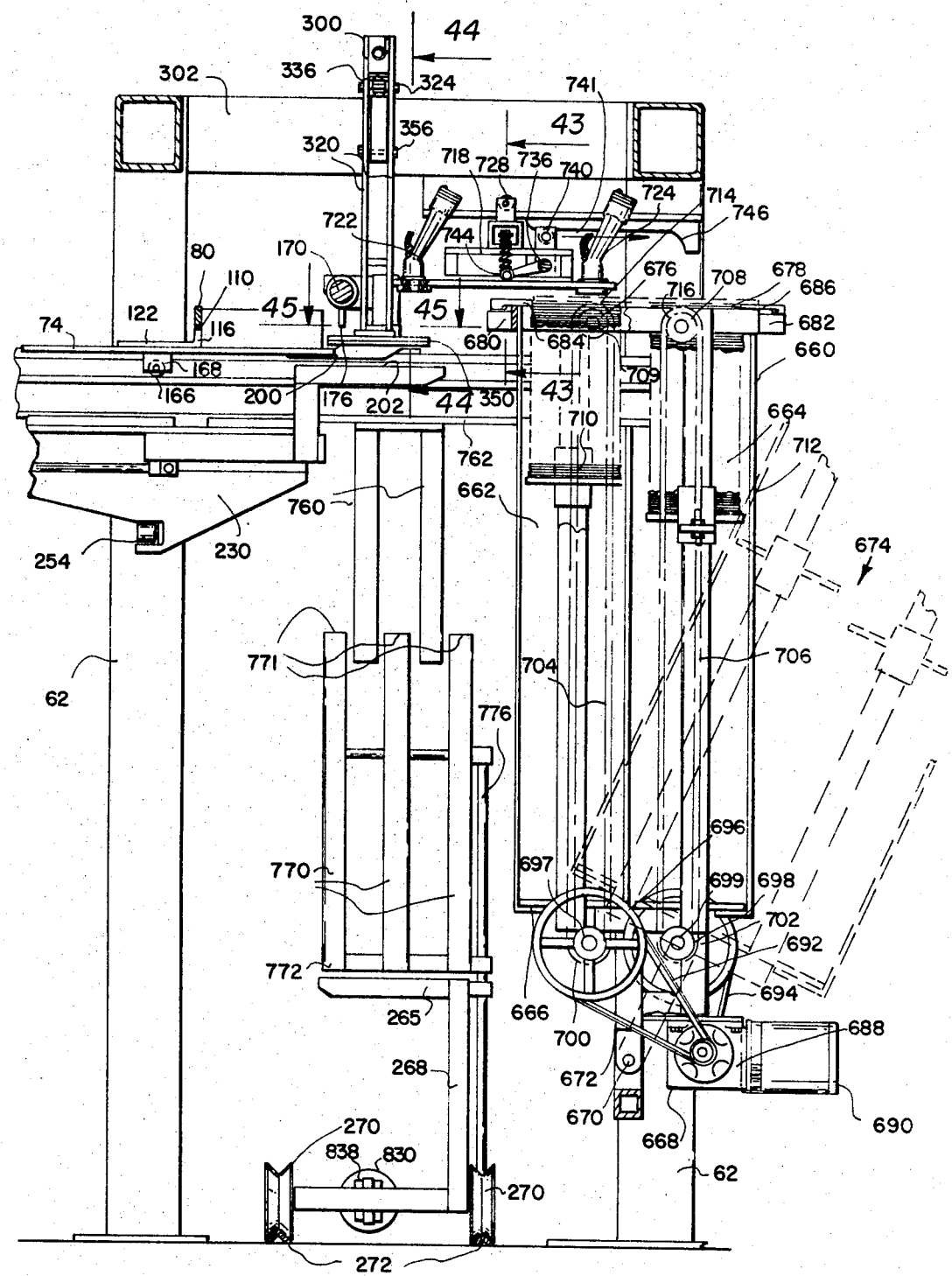
Figure 46:
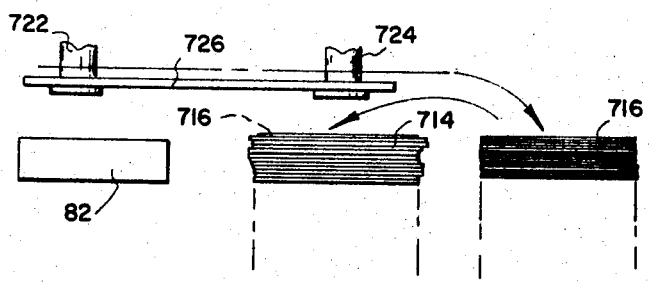
Figure 47:
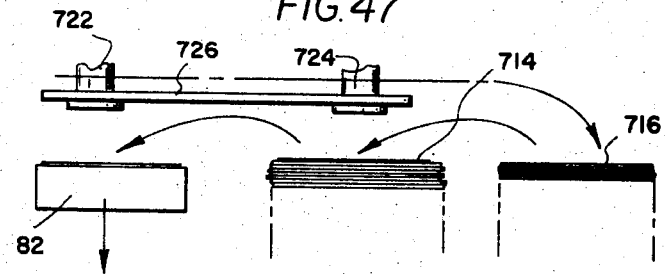
Figure 48:
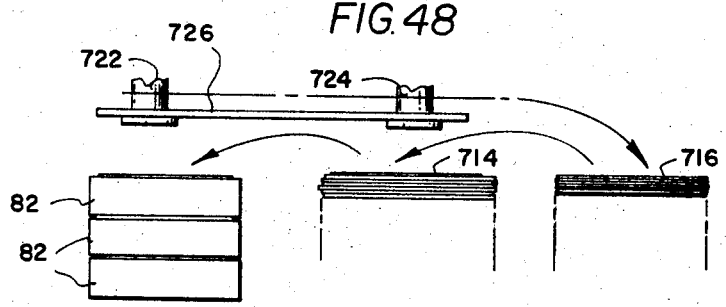
Figure 49:
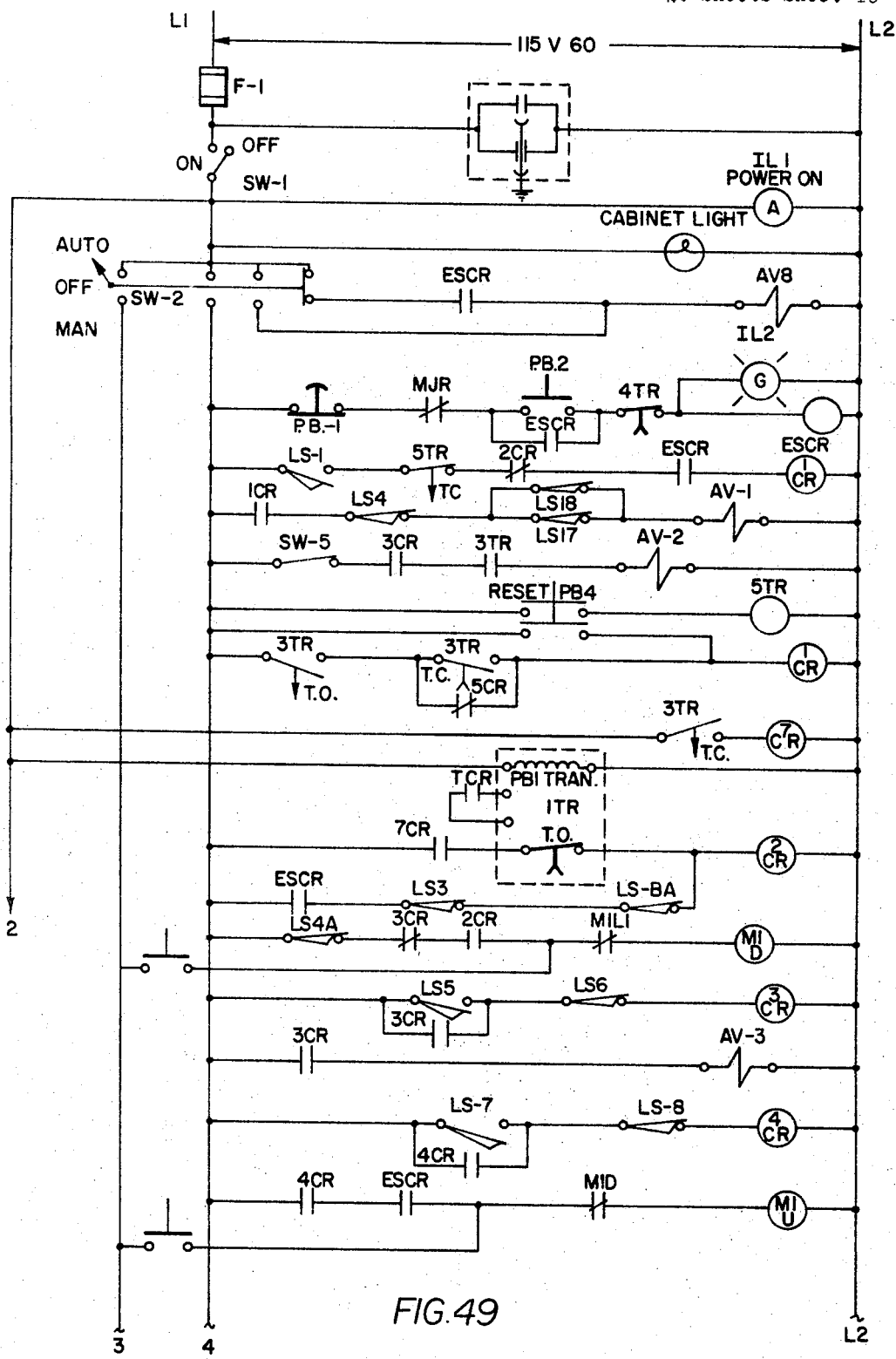
Figure 50:
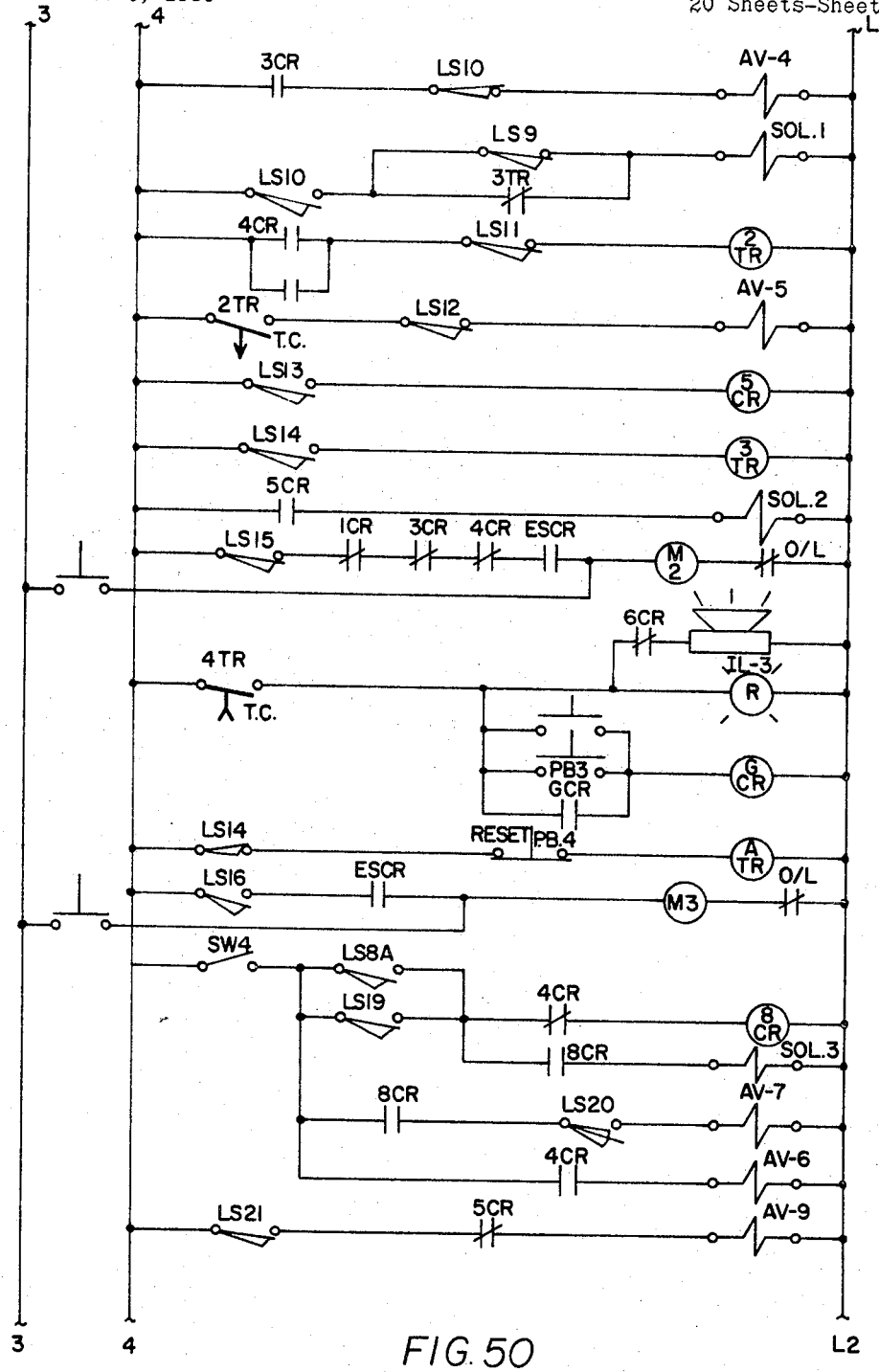
Figure 51:
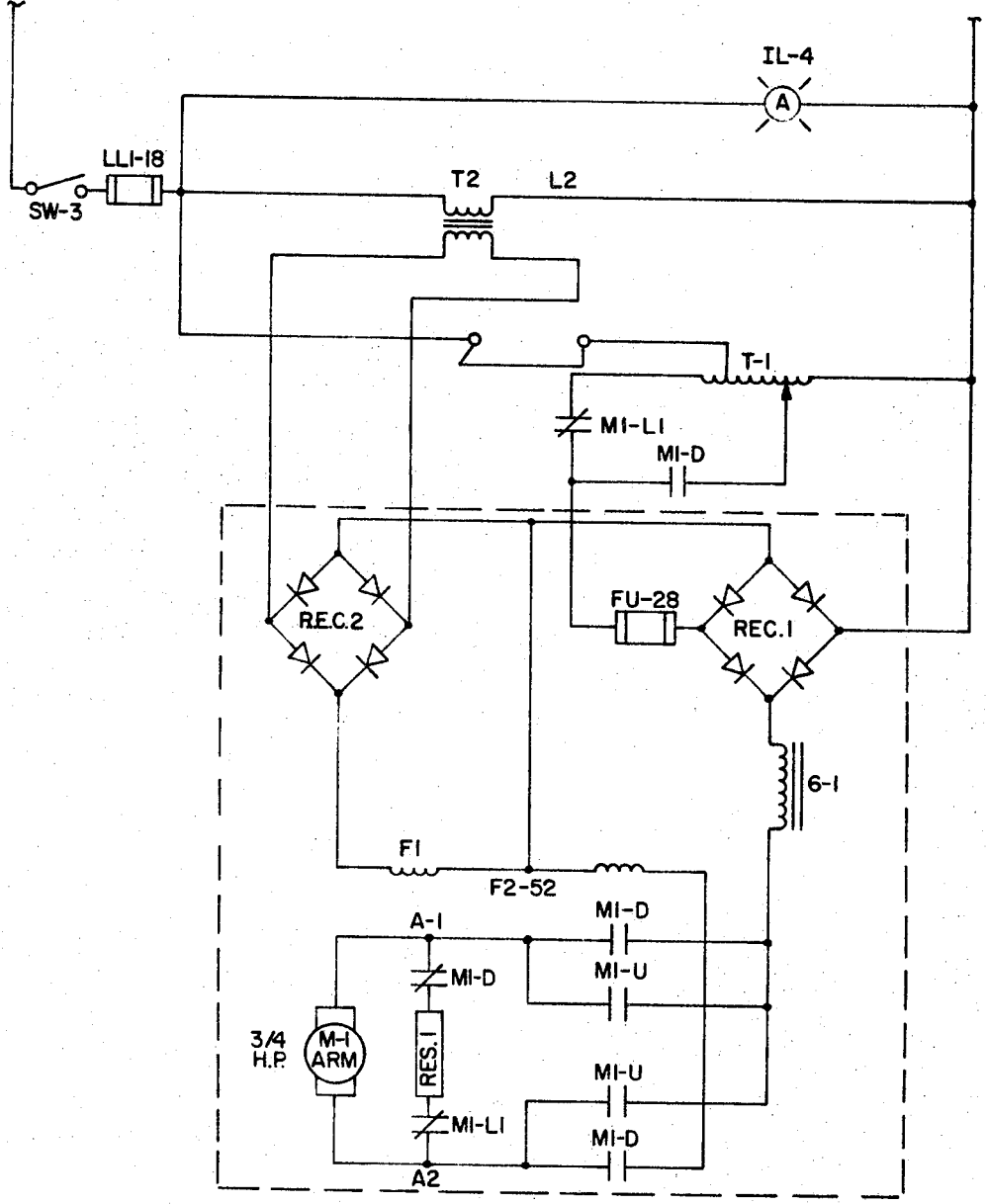

FIG. 39 is a side elevational view of a stack of bricks, as stacked by the machine of the invention, comprising voids in the stack formed by the omission of some bricks in a course and overlaid by a pallet which is automatically inserted by the machine for protecting the undersurfaces of bricks overlying the voids or openings, such that tines of a fork lift handling device may be inserted through the voids and brought to bear upward against the pallet under the overlying bricks;

FIG. 40 is a view of the stack taken from the line 40—40 of FIG. 39;

FIG. 41 is a view of the brick gate mechanism similar to that, as shown in FIG. 35, but showing a modification of the mechanism which corresponds with the formation of a stack of bricks, shown in FIGS. 39 and 40;

FIG. 42 is a side elevational view of a modified structure of the machine of the invention, FIG. 42 being similar to FIG. 4, but showing other means in the paper and pallet feed mechanism, as well as clamping means for engaging a row of bricks and holding said row in juxtaposition while the deck plate is moved from beneath the row so that it may be accurately deposited directly on the elevator of the machine by vertical release of the row of bricks from the clamp means;

FIG. 43 is a sectional view, showing pallet and paper handling mechanism details of the modified machine of the invention, taken from the line 43—43 of FIG. 42;

FIG. 44 is an enlarged fragmentary sectional view of clamping mechanism for holding rows of bricks in alignment adjacent to the gate means and for depositing such rows of bricks on the elevator of the machine, FIG. 44 being taken from line 44—44 of FIG. 42;

FIG. 45 is an enlarged fragmentary plan sectional view taken from the line 45—45 of FIG. 42, showing a pivoted brick engaging bar means of each of the clamp members of the modified structure, shown in FIG. 2, which clamp rows of bricks for holding them in juxtaposition over the elevator of the machine, while the deck plate is being retracted;

FIG. 46 is a diagrammatic view illustrating the transfer of sheets of paper and pallet members from the paper and pallet magazine structures to a position over rows of bricks on the elevator of the machine;

FIG. 47 is a view similar to FIG. 46, showing a progressive function succeeding that as shown in FIG. 46;

FIG. 48 is another diagramatic view similar to FIGS. 46 and 47, but showing an operation sequential to that disclosed in FIG. 47;

FIG. 49 is a diagrammatic view of electrical control equipment of the machine of the invention;

FIG. 50 is another view of further electrical and control equipment of the machine of the invention; and FIG. 51 is a further diagrammatic view of electrical and control equipment of the machine of the invention.

Figure 3:
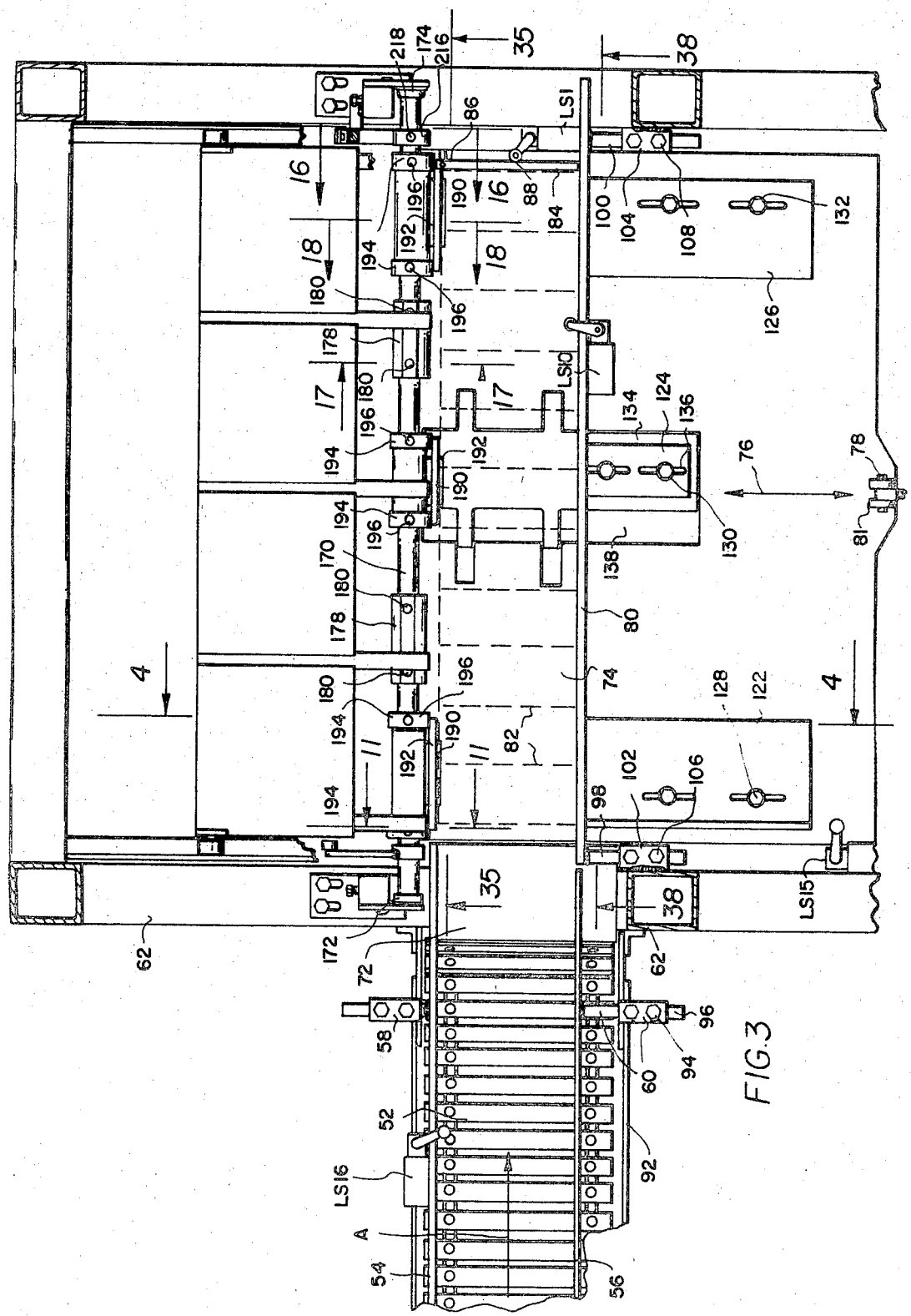
FIG. 3 is an enlarged fragmentary plan sectional view taken from the line 3—3 of FIG. 1 and shown rotated approximately 90°.

The machine of the invention, as shown best in FIGS. 2 and 3 of the drawings, is provided with a conveyor 52 disposed to carry bricks in the direction of an arrow A in FIG. 3 of the drawings. Opposed side rails 54 and 56 are spaced apart substantially the length of bricks to be conveyed, such that the longitudinal axes of the bricks are normal to the direction of the arrow A, and since the length of bricks vary slightly, the rails 54 and 56 are adjustable laterally of their axes by means of adjustable mounts 58 and 60, respectively, which are carried by a main frame 62 of the invention. As shown in FIG. 2 of the drawings, the main frame 62 is provided with a horizontally directed frame portion 64 which is supported at its outboard end 66 by legs 68 which may rest on a floor 70, which also supports the lower end of the main frame 62. Supported by the main frame 62 is a brick receiving platform 72 adapted to receive bricks from the conveyor 52 and to deliver bricks onto a sliding deck plate 74. The upper surface of the sliding deck 74 being on substantially a common plane with the platform 72 and the endless conveyor 52. The sliding deck plate is actuated back and forth in directions of an arrow 76 by means of a pressure fluid cylinder having a plunger 78 coupled to said deck plate by a clevis 81, all as shown best in FIG. 3 of the drawings.

Substantially aligned with the side rail 56 of the conveyor 52 is a bar 80 adjacent to which bricks, as indicated by broken lines 82, may accumulate on the sliding deck plate 74. It will be seen that the longitudinal axes of the bricks 82 are disposed normal to the rails 54 and 56 and the bar 80 and these bricks engage a lever 84 pivoted to the machine frame at 86. The lever 84 bearing against a roller 88 of a limit switch LS1, which controls the conveyor 52. Thus, when bricks have accumulated in a contiguous row on the deck plate 74, the switch 90 causes interruption of the operation of the conveyor 52.

The side rail 56 and the bar 80 are adjustable laterally of the axis of the conveyor, the rail 56 being supported on rod members 92 slidable in sleeves 94, wherein set screws 96 engage the rods 92 and hold the rail 56 in juxtaposition so that it may be spaced from the rail 54 a sufficient distance to accommodate bricks of different lengths. Likewise, the bar 80 is supported on rods 98 and 100 slidably mounted in sleeves 102 and 104 having set screws 106 and 108 for holding the rods 100 in juxtaposition to, thus, provide for lateral adjustment of the bar 80 to accommodate bricks of different lengths. The bar 80 is normally aligned with the bar 56 over the conveyor 52.

Figure 38:
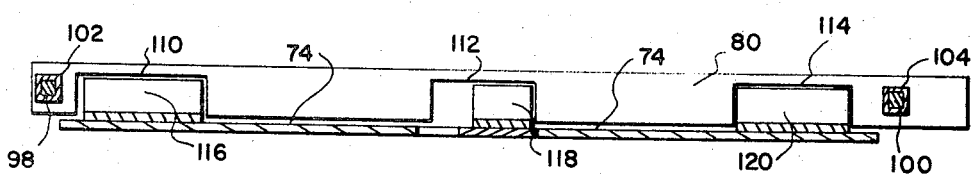
FIG. 38 is a fragmentary sectional view taken from the line 38—38 of FIG. 3, showing deck plate mechanism of the invention and illustrating an alignment bar extending thereover and having notches therein through which selective brick pusher members operate.

As shown in FIG. 38, the bar 80 is provided with notches 110, 112 and 114 in its lower portions. Mounted on the deck plate 74 are block pusher members 116, 118 and 120 projecting upwardly from the upper surface of the deck plate 74 and adapted to pass through the respective notches 110, 112 and 114.

The block pusher members 116, 118 and 120 are mounted on respective plates 122, 124 and 126 having slotted portions in which respective bolts 128, 130 and 132 are disposed, these bolts being screw threaded in the deck plate 74 and adapted to provide for fore and aft adjustment of the pusher members 116, 118 and 120 relative to the bar 80 and to the deck plate 74.

The plate 124 is mounted on a movable plate 134 by means of bolts 130, which extend through slotted portions 136 in the plate 124. The movable plate 134 is movable longitudinally with respect to the bar 80 and laterally with respect to the movement axis of the deck plate, as indicated by the arrow 76. An opening 138 is substantially larger than the width of the plate 134 and permits laterally movement thereof within the deck plate 74.

The plate 134 is supported, as shown in FIG. 25, on the bottom side of the deck plate 74. Rods 140 span the opening 138 and are secured to the bottom of the deck plate 74 by fixtures 142, 144, 146 and 148. The plate 134 is provided with sleeves 150 and 152 fixed thereon and provided with respective set screws 154 and 156 adapted to fix the sleeves 150 and 152 on the rods 140 to hold the plate 134 in lateral juxtaposition, if desired. Additionally, an actuating cylinder 158 mounted on the bottom of the plate 74 is provided with a plunger 160 pivotally mounted by means of a trunnion 162 on the bottom of the plate 134 for automated actuation of the plate 134 relative to the deck plate 74, as will be hereinafter described in detail.

The deck plate 74, as shown in FIG. 4 of the drawings, is supported by a track means 164 on each side thereof located approximately below the opposite edges of the deck plate. Bearing on each track 164 are rollers 166 connected to brackets 168, secured to the lower side of the deck plate 74. Thus, the deck plate 74 is slidably mounted to move horizontally relatively to the main frame 62 and forward and backward, in acordance with the double arrows 76, as shown in FIG. 3 of the drawings.

A gate supporting shaft 170 is pivotally mounted on the frame 62 at opposite ends of said shaft in bearings 172 and 174.

This gate shaft is rotably mounted in the bearings 172 and 174, as will be hereinafter described. Mounted on the shaft 170 are gate members 176. These gate members 176 are downwardly directed rectangular gate members disposed above the deck plate a sufficient distance to intercept bricks moved on said deck plate, when the deck plate moves toward the shaft 170, as will be hereinafter described. The downwardly directed gate members 176 are shown in FIGS. 3, 17 and 33; each gate member 176 is secured to a tubular member 178 and set screws 180 are screw threaded in a rib-shaped boss 182 of each member 178 and the inner ends of the set screws 180 are engaged in sockets 184 in the periphery of the shaft 170 to thereby fix the gate members 176 against rotation on the shaft 170 so as to permit actuation of these members 176 about the axis of the shaft during rotation only of the shaft 170.

Figure 33:
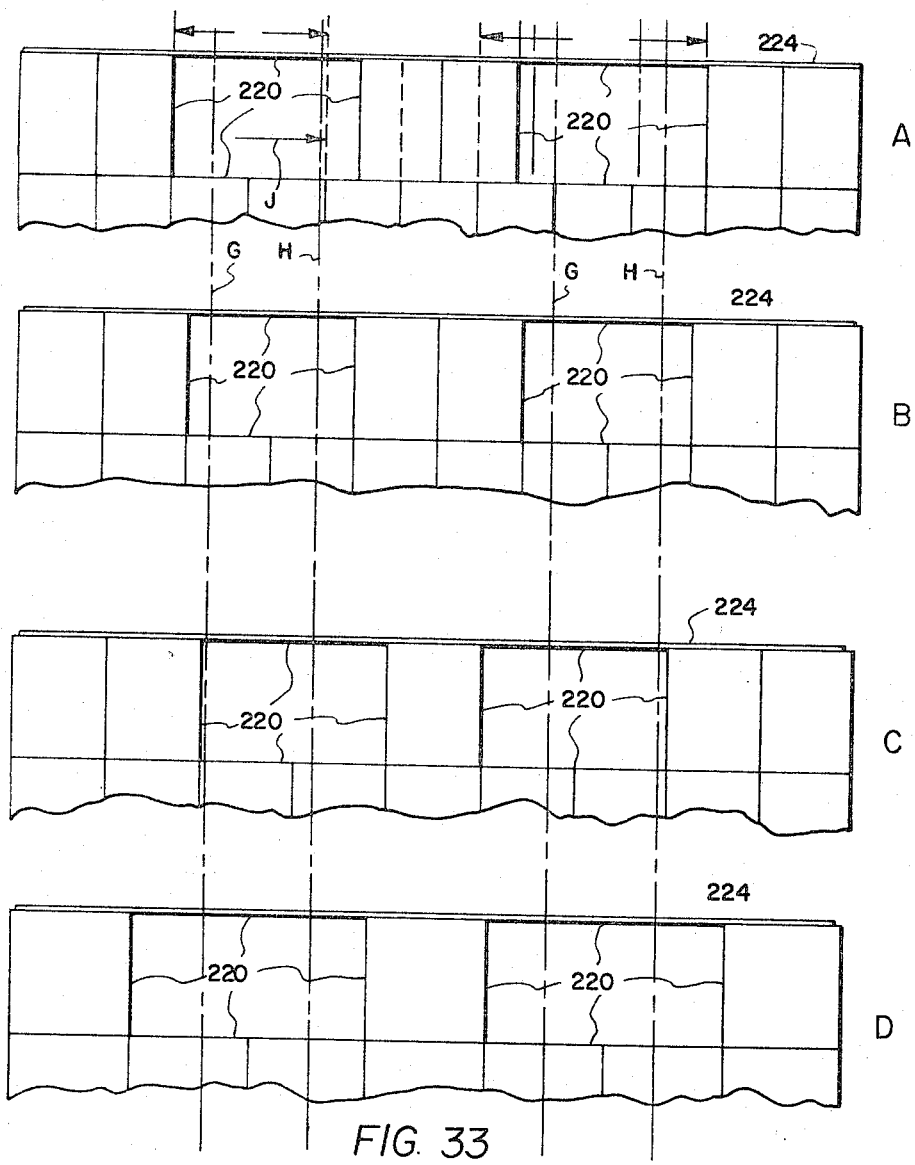
FIG. 33 is a diagrammatic view showing a relationship between the courses of stacks of bricks of different thicknesses as handled and stacked by the brick stacking machine of the present invention.

As shown in FIG. 33, there are two of these gate members 176 and they are adapted to function as restraining gates to hold back some of the bricks on the deck plate and alternatively to permit the bricks to slide thereunder. These gate members 176 are disposed between the brick pusher members 116, 118 and 120, such that the bricks pushed by the pusher members 116, 118 and 120 bypass the gate members 176, as will be hereinafter described in detail.

Brick gate members 186, as shown in FIGS. 3, 18 and 33, are pivotally mounted on the shaft 170, as will be hereinafter described. These gate members 186 are generally rectangular downwardly directed members and, as shown in FIG. 18, are each fixed to a hollow sleeve 188 rotatably mounted on the shaft 170. Each sleeve 188 is provided with a projecting bar 190 which is adapted to engage a bar 192 carried at its opposite ends by sleeves 194. These sleeves 194 are disposed at opposite ends of each sleeve 188 and these sleeves 194 are secured on the shaft 170 by means of set screws 196, which are similar to the set screw 180, described in connection with FIG. 17 of the drawings.

The set screws 196 secure the sleeves 194 on the shaft 170 and the sleeves 194 carrying the bar 192 provide an abutment for the bar 190, which is fixed to the hollow cylindrical sleeve 188, which carries the downwardly projecting brick engaging gate member 186. In this manner, the respective brick engaging gate member 186 is freely movable about the axis of the shaft in a counterclockwise direction, as shown in FIG. 18, and is limited in its movement in a clockwise direction by means of the bar 192 and shaft 170, as will be more fully described hereinafter.

When the shaft 170 is held stationarily against rotation, the downwardly directed brick engaging gate members 176, as shown in FIG. 17, prevent bricks from moving beneath the shaft 170, while the gate members 186 may be pivoted, as hereinbefore described, to permit bricks to pass beneath the shaft 170 and, thus, the members 176 in restraining the movement of bricks, leaves openings in rows of bricks to form openings in a stack of bricks in which fork lift prongs may be inserted, as will be hereinafter described.

The deck plate 74 is provided with a delivery edge 200, as shown best in FIGS. 4 and 12 to 15, inclusive, of the drawings. This edge 200 is normally positioned below the shaft 170, when the deck plate 74 is in retracted position, as shown best in FIGS. 3, 4 and 15 of the drawings. The plunger 78, hereinbefore described, is adapted to force the delivery edge 200 of the deck plate 74 to a position overlying an elevator platform 202, shown in FIGS. 4 and 12 to 15 of the drawings. The deck plate 74, when retracted from a position over the elevator platform 202, may leave a row of bricks on the upper surface 202 of the elevator platform. This, however, requires operation of the gate means, including the downwardly directed brick engaging gate members 176 and 186.

The pusher members 116, 118 and 120 are generally aligned with the gate members 186 so as to positively push bricks thereunder in such a manner, that these gate members 186 will freely move about the axis of the shafts in a counterclockwise direction, as indicated in FIG. 18, and also in FIG. 22. Thus, the pusher members 116, 118 and 120 positively move bricks through the gate means and under the freely pivotal gate members 186.

The gate members 176 fixed to the shaft 170 by means of the set screw 180 may be restrained, such that they prevent bricks from moving under the shaft 170 and such bricks are generally aligned between the respective pusher members 116 and 118, and 118 and 120, and thus, the deck plate 74 merely slides under the bricks and they are held generally in alignment with the conveyor 52 and these remaining bricks become members of another contiguous row of bricks, which accumulate on the deck plate 74 in alignment with the conveyor, as limited by the limit switch LS1, hereinbefore described. Restraint of the gate members 176 in fixed position, as shown in FIG. 16, is accomplished by a latch bar 204 pivotally mounted on a pin 206 on the frame 62. The latch bar 204 being connected to an armature 208 of a solenoid 210. An opposite end of the latch bar 204 is provided with a cam following roller 212 engaging an arm 214 fixed to the shaft 170 by means of a collar or sleeve 216 having a set screw 218 therein, which is recessed in the shaft 170 in a similar manner to the set screw 180. Thus, the arm 214, when engaged by the roller 212 on the latch bar 204, prevents rotation of the shaft 170 in a counterclockwise direction and prevents a similar movement of the gate members 176, thus, the bricks cannot force these members 176 to pivot out of the way and are thus retained in position substantially in alignment with the conveyor 52, while the other bricks in alignment with the gate members 186 are pushed thereunder by the pushers 116, 118 and 120.

When the armature 208 of the solenoid 210 is extended and moves the latch bar 204 to the broken line position, shown in FIG. 16, the arm 214 is permitted to pivot freely in a counterclockwise direction to permit rotation of the shaft 170 in the same direction and to thus allow the gate members 176 to pivot in a counterclockwise direction upwardly to clear bricks being frictionally moved on the upper surface of the deck plate 74. Thus, a complete row of bricks may be moved under the gate means of the invention, when the latch bar 204 is moved to the broken line position, shown in FIG. 16.

In the forming of a stack of bricks, as will be more fully described hereinafter, usually only one row of bricks may be formed in which the gate members 176 are restrained, so as to prevent blocks engaging these gate members from passing thereunder. Thus, as shown in FIG. 39, a pair of fork receiving openings 220 are formed in a stack of bricks, these openings 220 being for the purpose of receiving forks of fork lift truck mechanism or other handling equipment. Ultimately, the stack of bricks, as shown in FIGS. 39 and 40, is provided with a surrounding steel band 222 for holding the stack in assembly and a pallet 224 is disposed between superimposed courses of the bricks, this pallet 224 overlying the openings 220 and being disposed to protect bricks directly above these openings from engagement or damage by the forks of a fork lift truck, or the like.

The detailed operation of the gate means of the invention, with respect to forming a stack of bricks, as shown in FIGS. 39 and 40, and with respect to the operation of the gate means and the handling of bricks of various dimensions, will be hereinafter described in connection with FIGS. 19, 20, 21, 22, 35 and 33.

In accordance with the foregoing, it will be understood that the gate members 186 may pivot in a counterclockwise position at any time. Also, the gate members 176 being fixed to the shaft 170 may only pivot when released by the latch bar 204, hereinbefore described.

As shown in FIG. 19, the latch bar 204 thus prevents pivotal movement of the latch members 176 and the blocks 82 are prevented from passing under the shaft 170 to a position over the elevator platform 202. Thus, the row of bricks 82 forms a course of bricks in which openings are left, namely, the openings 220, hereinbefore described. During the same cycle of operation, as shown in FIG. 19, the gate members 186, shown in FIG. 20, pivot freely about the axis of the shaft 170 and permit the remaining bricks of the course to pass under the shaft 170 and these remaining bricks are the only ones in the course, as shown in FIG. 39.

As shown in FIG. 21, the latch bar 204 is in released position allowing the shaft 170 and the gate members 176 to pivot and permit the bricks 82 to pass thereunder.

Likewise, the gate members 186, shown in FIG. 22 and during the same cycle of operation, shown in FIG. 21, allow bricks 82 to pass thereunder and during the cycle, shown in FIGS. 21 and 22, a solid course or contiguous row of bricks passes under the shaft 170 to provide a contiguous row of bricks forming a course either above or below the openings 220, shown in FIG. 39.

In accordance with the foregoing mode of operation, the latch bar 204 may be moved to the solid line position, shown in FIG. 16, only once during the forming of a complete stack of bricks, as shown in FIG. 39, in order to provide for the openings 220 in which the forks of a fork lift truck may be inserted.

During only one cycle, the pallet 224 is inserted in a stack of bricks, as shown in FIG. 39, and this pallet 224 is laid above the course of bricks in which the openings 220 are disposed.

Attention is directed to FIGS. 33 and 35 which illustrate the adaptability of the gate means of the invention to the gating of bricks of different thicknesses. FIG. 33 is a diagrammatic view showing relative alignment of courses of bricks of different thicknesses, these bricks all being delivered on the conveyor 52 to the upper surface of the deck plate 74, as hereinbefore described. For purposes of illustration only, the upper diagrammatic portion A of FIG. 33, illustrates bricks which are 2¼ inches thick. The diagrammatic portion B of FIG. 33 illustrates bricks which are 2½ inches thick. The diagrammatic portion C illustrating bricks which are 2¾ inches thick and the diagrammatic portion D of FIG. 33, illustrating bricks which are 3½ inches thick.

Lines E and F in FIG. 35, correspond to lines G and H, respectively, in FIG. 33. It will be seen that one of the gate members 176 may be moved to a broken line position 177 and thus be moved laterally with respect to the 2¼ inch brick, shown in course A of FIG. 33. Thus, the corresponding lines E and F will assume the position of the broken lines 177 and overlap three of the 2¼ inch bricks on one side, while the remaining gate member 176 will only overlap two of the 2¼ inch bricks. Thus, the gap on one side of the course will be wider than the other and after the remaining bricks have passed under the shaft 170, the shifting mechanism shown in FIG. 25, moves the pusher member 118 laterally carrying the bricks in the remaining ones of the course to a central position in order to make the openings 220 even. Thus, the shifting plate 134 moves the bricks from a position indicated by the arrow J in FIG. 33, to the solid line positions of the bricks to provide uniform openings 220.

The shifting plate 134 is actuated after the bricks have passed under the gate mechanism and shaft 170.

In the course illustrations B, C and D, shown in FIG. 33, the shifting plate is not needed. In the course B, the gate members 176 restrain only two bricks each, which are 2½ inches thick and this is also true of the course C, wherein the 2¾ inch bricks are illustrated. Even though the bricks are somewhat offset laterally, they are restrained from passing under the shaft 170 by the gate members 176.

In the course D of FIG. 33, the gate members 176 each restrain the passage of two 3½ inch bricks to thus provide the openings 220 with one 3½ inch brick in the center of the course.

As each course of bricks passes under the shaft 170 with respect to the gate members 176 and 186 and when the plunger 78 retracts the deck plate 74 in a direction toward the bar 80, the gate members 176 and 186 all prevent retraction of the bricks 82 on the deck plate and thus the deck plate is slid from beneath the bricks and causing them to be deposited upon the platform 202 of an elevator 230, which is operable vertically in increments substantially equal to the normal edgewise elevation of bricks, it being understood that the bricks shown herein, are generally on their edges with their widest dimensions vertically and their longest dimensions laterally of the conveyor 52 and laterally of the course of bricks, as formed in the stack illustrated in FIG. 39. When the deck plate retracts to move out from under the bricks and deposit them on the platform 202 of the elevator, the members 190 on the sleeves 188 contact the bars 192, which prevents the gate members 186 from moving in a clockwise direction. The members 186 are thus fixed to the shaft 170, and the shaft 170 is restrained by the arm 214, shown in FIG. 16, and this arm 214 bears upon an adjustable stop screw 232, which prevents the shaft 170 from rotating in the clockwise direction. Thus, all of the bricks of a course which pass the gate members 176 and 186 are prevented from returning with the deck plate, when it is retracted from beneath the bricks so that all of the bricks may be deposited on the platform 202.

Figure 6:
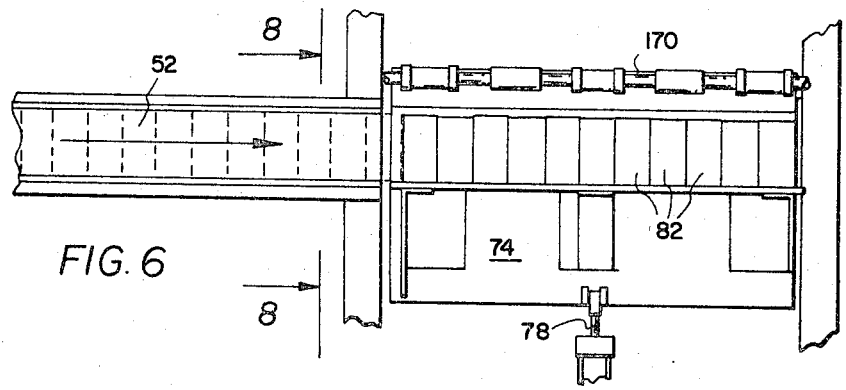
FIG. 6 is a reduced top or plan sectional view similar to FIG. 3 and showing accumulation functions, involving the accumulation of a row of bricks on the deck plate of the machine.
Figure 8:
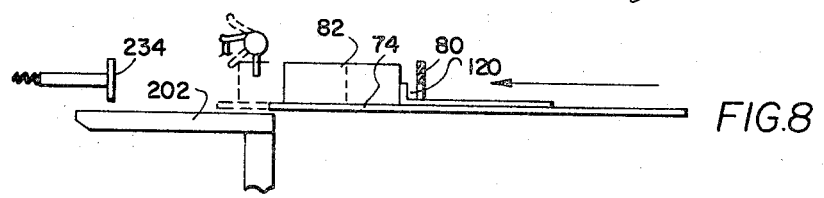
FIG. 8 is a diagrammatic view of operation of the machine taken from the line 8—8 of FIG. 6.
Figure 9:
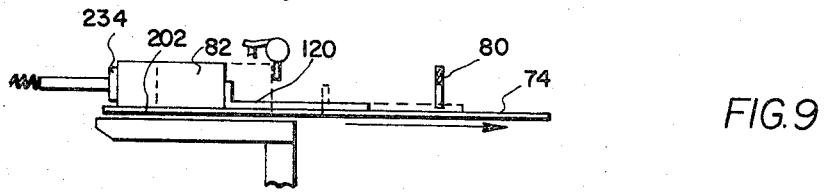
FIG. 9 is another similar diagrammatic view, taken from the line 9—9 of FIG. 7.
Figure 10:
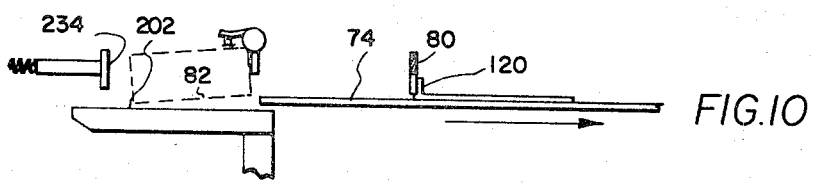
FIG. 10 is a further diagrammatic view, showing a retraction of the deck plate of the machine and the holding of a row of bricks in place over the elevator of the machine to deposit the row of bricks on the elevator from the deck plate of the machine.
Figure 11:
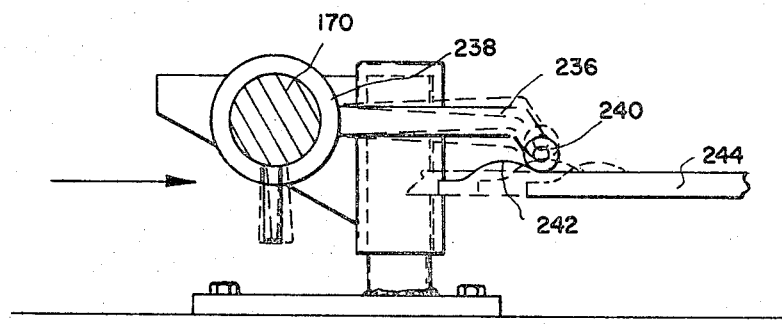
FIG. 11 is an enlarged sectional view of gate control mechanism of the invention, taken from the line 11—11 of FIG. 3.

Each course of bricks, as it collects on the deck plate 74 from the conveyor 52, may be disposed as shown in FIG. 6 of the drawings, whereupon the plunger 78 of its respective pressure fluid cylinder 79 forces the deck plate 74 to move the course of bricks under the shaft 170 and beyond the gate members thereon, as shown in FIGS. 8, 9 and 10. As the bricks 82 pass into position over the platform 202, they engage a spring loaded alignment bar 234, which tends to align all of the bricks with each other on the platform 202 or on the next lower course of bricks, as the stack is being formed on the elevator.

Attention is now directed to FIGS. 11 to 15, inclusive, showing further brick course alignment means, wherein an arm 236 is connected to a sleeve 238 on the shaft 170 preferably by set screws, or the like. The arm 236 is provided with a roller 240 adapted to be engaged by a cam 242 on a bar 244 carried in connection with the deck plate 74 and movable in unison therewith.

Figure 12:
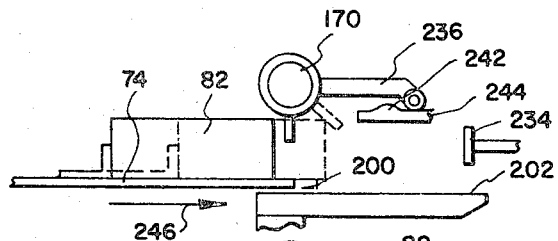
FIG. 12 is a vertical sectional view of the deck plate and brick gate mechanism of the invention, shown in relation to the elevator of the invention and coresponding generally to the disposition of the mechanism, as shown in FIG. 6 of the drawings.
Figure 13:
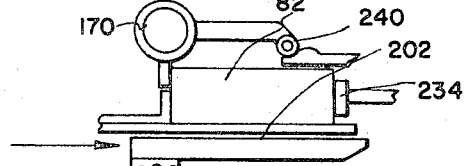
FIG. 13 is a view similar to FIG. 12, showing a successive operation of the mechanism relative to that shown in FIG. 12.
Figure 14:
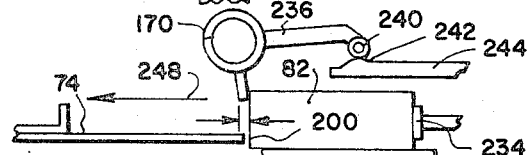
FIG. 14 is a view similar to FIG. 13, but showing a progressive operation following that, as shown in FIG. 13.
Figure 15:
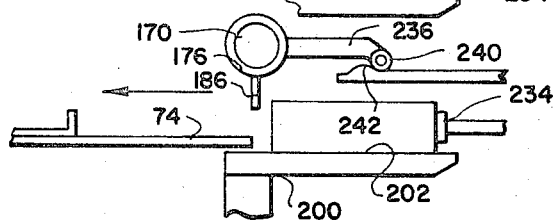
FIG. 15 is another view similar to FIG. 14, but showing a progressive operation of the mechanism following that, as shown in FIG. 14.

As shown in FIG. 12 of the drawings, the cam 242 and arm 244 move with the deck plate 74 in the direction of an arrow 246, when the bricks 82 are being moved under the shaft 170 and to a position on the platform 202 of the elevator 230. When the bricks 82 have passed beyond the gate mechanism, as shown in FIG. 13, and when the deck plate 74 is retracted, it carries the arm 244 and cam 242 in the direction of the arrow 248, causing the cam 242 to engage the roller 240 and raise the arm 236, which causes counterclockwise pivotal movement of the shaft 170 and this is momentarily assisted by release of the latch bar 204 in accordance with an electrical control system to be hereinafter described.

During slight counterclockwise movement of the shaft 170 and the latch members 176 and 186, the edges of the bricks 82 are engaged by the these latch members 176 and 186 and are forced thereby into firm engagement with the alignment bar 234. Thus, the bricks in each course are precisely aligned by the bar 234 and by the operation of the arm 236, roller 240 and the cam 242.

After each course of bricks is deposited upon the platform 202, the elevator 230 is moved downwardly a distance equal to the elevation of the course of bricks thereon and also to include the thickness of a course pallet, if desired. The elevator 230 is mounted on vertical frame tracks 250 by means of rollers 252 and 254, which bear lateral loading, while secondary rollers 256 and 258 carry the load on the vertical tracks at right angles to the loading of the rollers 252 and 254, all as shown best in FIGS. 5, 23 and 24.

The platform 202 of the elevator 230 is composed of a main bar 260 and a plurality of spaced fingers 262, which are adapted to mesh with similar spaced fingers 264 on a bar 266 of a carriage 268 carried by wheels 270 rolling on inverted V-shaped tracks 272. The platform 202 is retractably mounted to move horizontally on the elevator 230 and is powered back and forth thereon by means of a plunger 274 of a pressure fluid cylinder 276. As shown in FIGS. 23 and 24, tracks 257, carried by the rollers 252, 254, 256 and 258 support rollers 255, which provide for horizontal movement of the platform 202, when actuated by the plunger 274. Thus, the fingers or bars 262 of the platform 202 may be moved out of mesh with the bars or fingers 264 of the platform portion 265 of the carriage 268, in order to permit a stack of bricks to be transferred from the elevator platform 202 to the carriage platform 265. During this operation, the elevator is moved downwardly with the fingers 262 passing through or between the fingers 264 until a stack of bricks rests on the platform 265 of the carriage 268, whereupon the platform 202 may be retracted to the solid line position, shown in FIG. 5, by means of retraction of the plunger 274 of the cylinder 276 and, thus, the platform 202 is out of interference with the platform 265 so that the carriage may move longitudinally along the tracks 272 to deliver a stack of bricks deposited thereon to a binding machine which places the strap 222 around the stack of bricks, as shown in FIG. 40; said binding machine being no part of the present invention.

Figure 1:
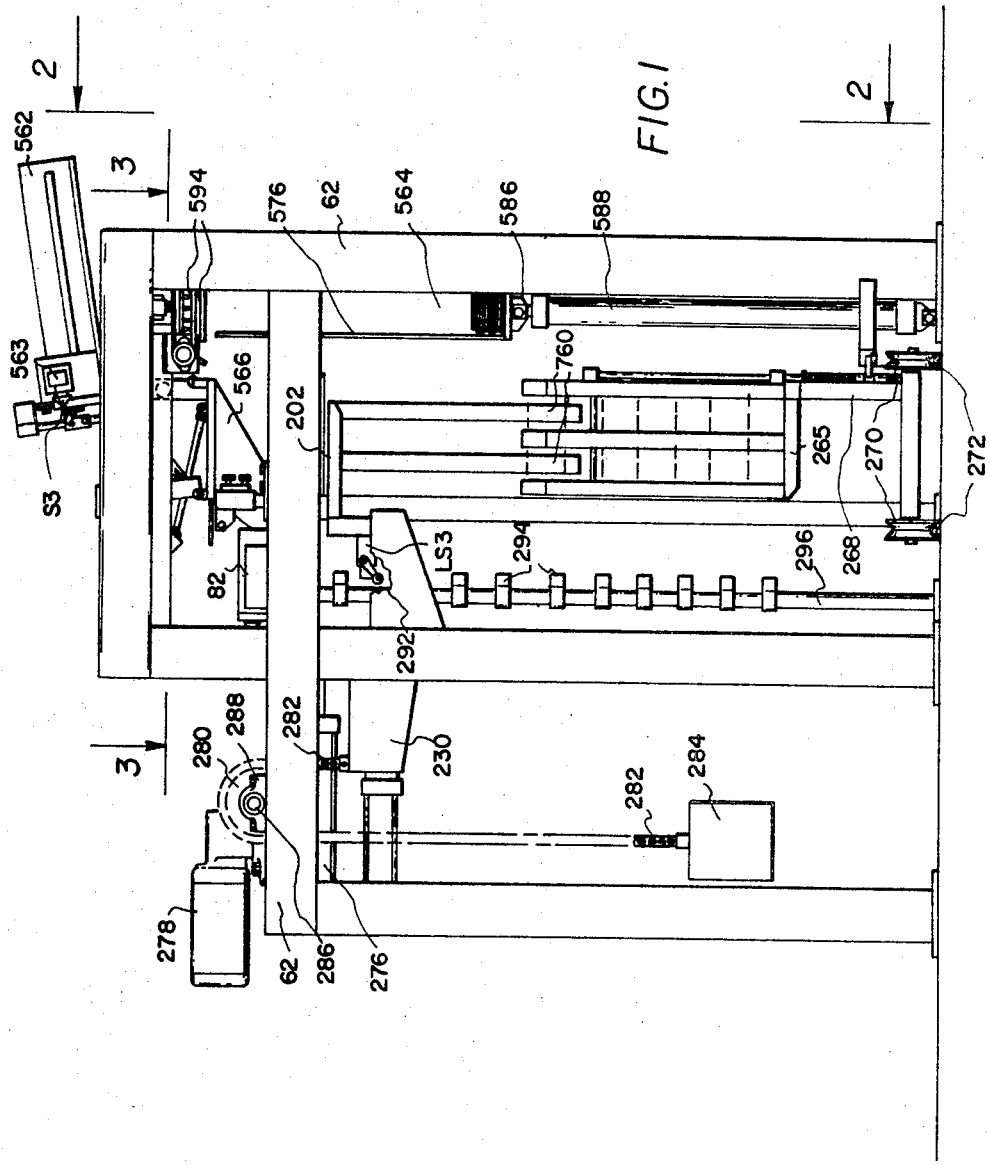
FIG. 1 is an end elevational view of a brick stacking machine in accordance with the present invention.

The elevator 230, shown in FIGS. 1 and 5 of the drawings, is powered by means of a motor 278 driving a sprocket 280, which engages a chain 282 having its normally lower end connected to the elevator 230 and having its opposite end connected to a counterweight 284 so as to minimize the power requirements for driving the elevator up and down and substantially to balance the weight of the elevator, as shown in FIG. 1 of the drawings, the motor 278 is mounted on the frame 62 and a shaft 286 driven thereby, is mounted on pillow blocks 288, also carried by the frame 62.

Operation of the motor 278 is controlled by a limit switch LS3 having an arm supported roller 292 adapted to engage superimposed projections 294 on a vertical storey pole 296. Thus, the projections 294 are vertically spaced substantially equal to the vertical dimensions of courses of bricks, so as to control the downward movement of the elevator 230 to successively place the platform 202 in position to receive courses of bricks, one on top of the other, and thus each cycle of the machine includes energization of the motor 278 to move the elevator 230 downwardly until the limit switch LS3 is operated by contact of the roller 292 with one of the projections 294 on the pole 296. Thus, the elevator is positioned sequentially for receiving one course of bricks on top of another to form the stack substantially, as shown in FIG. 39 of the drawings.

Each time the elevator 230 is positioned to receive a course of bricks, and when the deck plate 74 has been moved to carry a course of bricks beyond the gate mechanism of the shaft 170, and before the deck plate is retracted, a clamp means 300 is actuated, as shown in FIGS. 42 and 44. Thus, the row or course of bricks is clamped together and suspended before the cylinder 79 is energized to retract the plunger 78 and the deck plate 74.

The clamping mechanism shown in FIGS. 42 to 45, inclusive, is designed to hold a row or course of bricks above the elevator platform 202 until the delivery edge 200 of the deck plate 74 has been retracted from beneath the row of bricks above the elevator. This is to prevent tilting of the bricks from the level of the deck plate to the level at which they will be carried downwardly on the elevator 230 and, thus, tipping the misalignment of the bricks is prevented, as the deck plate is slid from beneath the bricks, all as will be hereinafter described in detail.

The clamping mechanism for holding the row of bricks is generally indicated at 300 in FIGS. 42 and 44, it being understood that this mechanism is not shown in other figures of the drawings, and may constitute a preferred embodiment of the invention although the mechanism previously described may operate without the clamp means 300.

This clamp means 300 is located generally above the elevator platform 202 and in a position to clamp opposite ends of a row of bricks which have been pushed beyond the gate members 176 and 186, as hereinbefore described. The clamp mechanism 300 is carried by a superimposed portion 302 of the frame 62. The clamp mechanism comprises a bar 304, as shown in FIG. 44, this bar is provided with slotted portions 306 and 308 on its opposite ends through which bolts 310 and 312, respectively, are disposed. These bolts are extended through brackets 314 and 316 on the superimposed portions 302 of the frame 62. Thus, some lateral adjustment of the bar 304 may be obtained to position opposed clamping arms 318 and 320 with respect to opposite ends of a row of bricks as may be pushed beyond the gate members 176 and 178.

Figure 7:
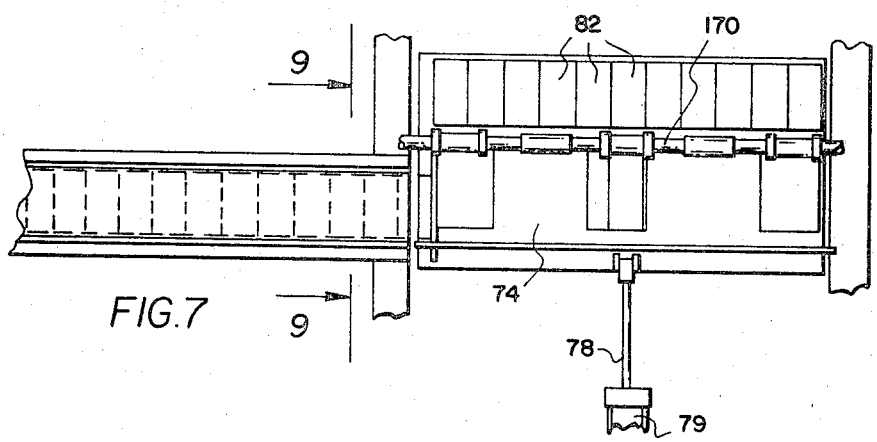
FIG. 7 is a view similar to FIG. 6, but showing a movement of the deck plate of the machine to project the row of bricks into a position over the elevator structure of the machine.

It will be understood that the control mechanism of the invention, including the electrical and fluid operated equipment, will permit the clamp mechanism, shown in FIG. 44, to operate only when there is a contiguous row of bricbks, such as illustrated in FIG. 7, disposed above the elevator platform 202. The clamp mechanism 300 cannot be operated when a course of bricks is passed through the gate mechanism of the invention, to provide for the fork receiving openings 220, shown in FIG. 39. Thus, this is the only course of bricks in a stack in which the clamp mechanism 300 is not used.

With further reference to FIGS. 44 and 45, it will be seen that the clamp jaws 318 and 320 are mounted on pins 322 and 324, respectively, which are carried by the bar 304. Upper ends of the arms 318 and 320 are provided with clevis portions 326 and 328. Pivotally connected to the clevis portion 326 is a plunger 330 of a pressure fluid cylinder 332. This cylinder is pivotally connected at 334 to a link 336, which at its opposite ends is pivotally connected to the clevis 328.

A tension spring 338 is connected to an upper end portion 340 of the arm 320 and the opposite end of the spring 338 is connected to a clamp member 342, which is longitudinally and adjustably fixed to the bar 336 to provide adjustable tension between the upper ends of the arms 318 and 320.

Due to the angular disposition of the spring 338 and the pivotal connection of the link 336 between the clevis 328 and the cylinder 332, these members may be pivotally moved slightly out of alignment by the spring 338, under tension, for pivoting the jaw end 344 relative to an end of the arms 320.

Each jaw end of each of the arms 318 and 320 is constructed substantially, as shown in FIG. 45, wherein the arm 318 is provided with a pivot pin 348 to which a jaw member 350 is pivotally mounted. The axis of the pivot pin 348 is vertical and permits the jaw member 350 to pivot about a vertical axis.

Each jaw member 350 is provided with engaging nibs 352 and 354 adapted to engage a side 83 of one of the bricks 82 and pivotal movement of the jaw member 350 about the axis 348 provides precise engagement and alignment so that a row of bricks, as indicated in FIG. 7, may be held in contiguous relationship between the jaw members 350, on the lower ends of the arms 318 and 320. Thus, a row or course of bricks may be suspended, while the deck plate 74 is retracted from beneath the bricks, whereupon de-energization of the cylinder 332 by control mechanism of the invention, will drop the course or row of bricks a short distance onto the elevator platform 202 or on a course or courses of bricks carried thereon. It will be understood that the jaw or clamp mechanism 300 of the invention tends to prevent misalignment of a row of bricks and retain the alignment thereof, as previously accomplished by operation of the mechanism shown in FIGS. 8 to 15 of the invention.

It will be seen that the jaw members of the mechanism 300 are spaced apart sufficiently to permit a complete contiguous row of bricks to be forced therebetween on the deck plate 74 and that the arm 320 is maintained in fixed position by means of a pin 356 extending through a portion of the bar 304 and, thus, longitudinal alignment of a row of bricks may be maintained by fixed position of the arm 320, while pivotal movement of the arm 318 provides for clamping action of a row of bricks between the jaws 350, as hereinbefore described.

Reference is made to FIG. 39 of the drawings, wherein a pallet 224 is superimposed between courses of bricks in a stack to provide for a bearing above forks of a fork lift truck so as to prevent damage of bricks above the opening 220, when the stack is carried on such forks and also to hold the superimposed bricks above the openings 220, this pallet 224 is preferably made a thin sheet of wood, but may be made of other suitable materials, as desired.

It is preferable that sheets of paper belocated at intermediate areas 560 between superimposed courses of bricks in order to protect the bricks and to provide for efficient binding and packaging of the bricks and, thus, a sheet of paper is located in intermediate positions 560 of the stack 39 and the pallet 224, hereinbefore described, is inserted in the position, as shown in FIG. 39, during the forming of the stack of bricks on the elevator 230, as hereinbefore described.

The pallet and paper feeding mechanism is disclosed generally in FIGS. 1, 2, 4, 20 to 32, 42 and 43, and in FIGS. 46 to 48, inclusive.

As shown in FIGS. 1, 2 and 4, a paper feeding magazine 562 is supported on an upper portion of the machine frame 62, while a wooden pallet feeding magazine 564 is disposed below the paper feeding magazine 562.

Connected to the deck plate 74, as show in FIG. 4 of the drawings, is a pallet and paper feed carriage 566 having a platform 568 adapted to receive sheets of paper or wooden pallets thereon, as will be hereinafter described..

The carriage 566 moves backwardly and forwardly in connected relation with the deck plate 74 during each cycle of operation of the deck plate and the functions thereof, which have been hereinbefore described.

The carriage 566 is supported at its outer end on tracks 570 by means of rollers 572 connected to the carriage 566 by suitable brackets 574.

The pallet feeding magazine 564 is provided with substantially stationary vertical guide plates or bars 576 and 578, which are spaced and between which a stack of pallets 580 is positioned. A lower portion 582 of the stack of pallets rests on a vertically movable platform 584 which is vertically actuated in connection with a plunger 586 of a hydraulic cylinder 588. The platform 584, as shown in FIG. 2, is carried by sleeves 585 and 587 slidably mounted on vertical guide posts 589 and 561.

During each cycle of pallet delivery, the platform 584 is moved upwardly by the plunger 586 until an uppermost pallet 590 of the stack 580 engages a spring loaded plate 592. This spring loaded plate is perforated to receive spikes 594 therethrough. Thus, when the plunger 586 forcefully raises the stack of pallets, the uppermost pallet 590, when rammed into engagement with the plate 592, moves it upward against compression of a spring and causes the uppermost pallet 590 to be impaled upon the spikes 594. These spikes 594 are fixed to a stationary plate 595 and disposed above the plate 595 is a solenoid 598 having a plunger projecting downwardly through the plate 595 and adapted to engage the spring mounted plate 592 for forcing it downwardly away from the spikes 594 and for removing the pallet therefrom, so as to drop the pallet on the upper surface 568 of the carriage 566, when it is positioned below the plate 592 and the impaled pallet.

This operation occurs, when the deck plate has forced a row of bricks beneath the shaft 170 and the gate members 176 and 186, as hereinbefore described.

For a detailed description of the foregoing pallet handling functions, reference is hereby made to FIGS. 29 to 32, inclusive, of the drawings.

When the plunger 586 moves upward, it forces the uppermost pallet 590 to be impaled on the ends of the spikes 594, while the plate 592 at its openings 597 pass around the spikes 594. At this time, the solenoid 598 is energized so that its plunger 599 retracts the plate 592 so as to permit the uppermost pallet 590 to be impaled upon the spikes 594 and to be retained thereon until the carriage 566 has been positioned beneath the impaled pallet 590, all as shown in FIG. 30 of the drawings.

When the carriage 566 is moved to a position, shown in FIG. 31, the solenoid 598 may be de-energized so as to project its plunger 599 and move the plate 592 downwardly to force the pallet 590 from the ends of the spikes 594 and to thus deposit the impaled pallet on the upper surface of the carriage 566. The carriage may then proceed in the direction, as indicated in FIG. 32, and move in unison with retraction of the deck plate 74 to a position over the elevator platform 202.

During the next cycle of operation, a pallet ejector pawl 600 engages an edge 601 of the pallet 590 and when the carriage 566 moves in the direction, indicated by an arrow 602 to the position, shown in FIG. 31, the pawl 600 rakes the pallet 590, as indicated by broken lines 604, off the platform 566 and it drops upon the uppermost row or course of bricks carried on the elevator platform 202.

The pawl 600 is mounted on a shaft 606 having friction bearings tending to hold the pawl 600 in various positions, as shown in FIGS. 30 to 32 of the drawings. A cam roller 608 on one end of the carriage 566 tends to pivot the pawl 600 in a counterclockwise direction, while a roller 610 mounted near the opposite end of the carriage tends to pivot the pawl 600 in a clockwise direction. Thus, as indicated in FIG. 31 of the drawings, the carriage, when moving toward the plate 599, causes the cam roller 610 to engage the pawl 600 and to move it to the position, shown in FIG. 31, as to permit the next pallet 590 to pass under the pawl, whereupon the cam roller 608, which is disposed at a higher elevation than the cam roller 610, engages the pawl 600 and moves it downward into the position substantially, as shown in FIG. 30, upon movement of the carriage 566 toward the shaft 170. Accordingly, each cycle of operation includes a pivotal movement of the pawl 600 into and out of engaging position with pallets so as to successively rake each successive pallet from the platform of the carriage 566, when the carriage 566 moves in the direction, as shown in FIG. 31, to thereby drop a pallet on the uppermost surface of a course of bricks on the elevator platform 202.

As hereinbefore pointed out, and as shown in FIG. 39, only one cycle of operation of the pallet feed mechanism, hereinbefore described, is permitted during the forming of each stack of bricks to form the protective structure above the openings 220, as shown in FIG. 39.

The paper feed magazine 562 is disposed in a slightly declining position relative to the horizontal and in a direction toward the carriage 566 and a vacuummatic paper handling mechanism, generally indicated at 620 in FIG. 4 of the drawings, is operable to transfer sheets of paper from the magazine 562 to the upper surface 568 of the carriage 566.

The paper magazine 562 is provided with sheets of paper 622 disposed generally on their edges with their flat planes almost vertically disposed.

A movable plunger plate 624 tends to force the sheets of paper 622 in the direction of an arrow 625 and into engagement with spaced retaining fingers 626 which are pivotally mounted on a shaft 628 and which extend downwardly generally in a vertical direction.

Thus, the sheets of paper 622 may be slidably removed from a position behind the fingers 626, when engaged by vacuummatic paper pick-off heads 630 of the paper handling mechanism 620, to be hereinafter described in detail.

The paper handling mechanism 620 is pivotally actuated in unison with the operation of the carriage 566. A pin 632 pivotally connects a link 634 to the carriage 566 and the opposite end of the link 634 is pivotally connected to a pin 636 carried by a lever 638. It will be appreciated that there are a pair of links 634 connected to the carriage at opposite ends thereof adjacent opposite ends of the shaft 170 and that there are a pair of levers 638 which are substantially identical parts at opposite ends. Accordingly, a description of the duplicate parts will bear the same reference characters.

Figure 36:
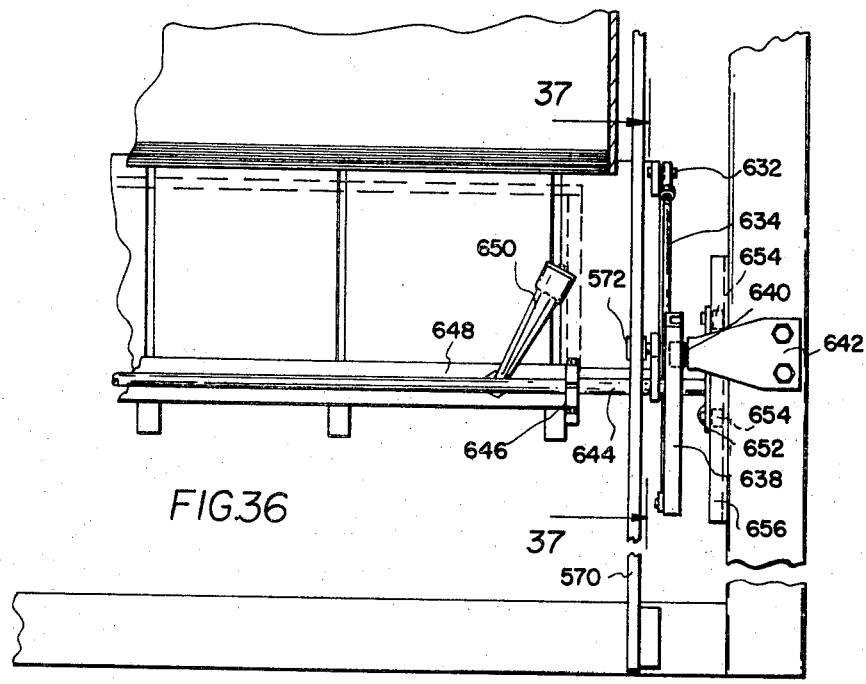
FIG. 36 is a plan sectional view of paper handling mechanism taken from the line 36—36 of FIG. 4, and showing the view FIG. 36 rotated substantially 90° from that as shown in FIG. 4.
Figure 37:
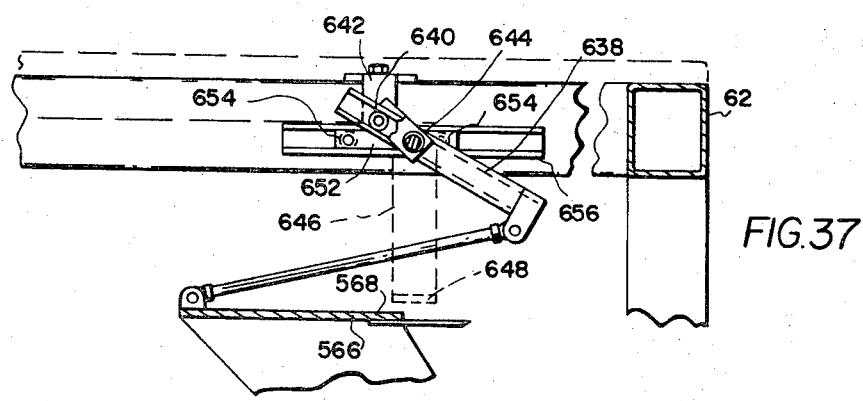
FIG. 37 is a fragmentary sectional view taken from the line 37—37 of FIG. 36.

The lever 638 is channel-shaped in cross-section, as shown in FIGS. 36 and 37, and this channel-shaped in cross-section structure forms a track which engages a cam following roller 640 mounted on a bracket 642 carried by the frame 62.

A shaft 644 interconnects the levers 638.

Secured to this shaft 644 are downwardly depending members 646 which carry a horizontally disposed bar 648 on which are mounted a pair of vacuummatic pickup devices 650. These devices 650 are provided with vacuum nozzle openings 652 extending through the bar 648, so that when the bar 648 is placed adjacent to a sheet of paper in the stack 622 and between the fingers 626, that the paper is vacuummatically attracted to areas adjacent the opening 652 sufficiently to be pulled from the stack 622 and away from the arms 626, whereupon the bar 648 may be swung down into close proximity with the upper surface 568 of the carriage 566, whereupon a release of the vacuum in the vacuum assembly 650 will permit paper to drop on the upper surface of the carriage 566 and to be raked therefrom by means of the pawl 600, hereinbefore described.

With further reference to the mechanism of the paper handling device 620 and particularly that shown in FIGS. 36 and 37, it will be seen that the opposite ends of the shaft 644 are secured to short shaft carriages 652 supported by rollers 654 operating in channel-shaped tracks 656 adjacent opposite ends of the shaft 644. Additionally, it will be seen that the channel arms 638 may move relative to the fixed cam followers 640, so as to provide for a compound swinging movement of the bar 648, as the carriage 566 moves in a direction toward the pallet magazine 564, as shown in FIG. 4, and to thereby place the openings 652 of the bar 648 into adjacent relationship with a sheet of paper at an end 658 of the stack of paper sheets, designated 622 in FIG. 4 of the drawings.

The vacuum assembly 650 are aspirator-type mechanisms adapted to be energized by air jets therein and this mechanism is energized each cycle of operation during the movement of the deck plate 74 back and forth with one exception, and this exception is during the cycle, when the pallet 224 is placed on the stack of bricks carried on the platform 202 of the elevator.

During this cycle, the vacuummatic assembly 650 are not energized and, consequently, do not remove a sheet of paper from the magazine 652.

A modified pallet and paper handling means is shown in FIGS. 42, 43, 46, 47 and 48, and while this mechanism may be a modification of the present invention, it represents the preferred form of paper and pallet handling mechanism, in accordance with the invention.

As shown in FIG. 42, a pallet and paper handling magazine frame 660, this frame 660 is provided with a pallet containing compartment 662 and a paper sheet containing compartment 664. A lower end 666 of the frame 660 encloses lower portions of the compartments 662 and 664 and this lower end 666 is mounted on a cross member 668 of the frame 62 by means of a pin 670 extending through a bracket 672 which supports the lower end 666 of the frame 660. Thus, the frame 660 may be pivoted into a broken line position, indicated generally at 674, so that normally upper open ends 676 and 678 of the compartments 662 and 664 may be exposed for loading the compartments with pallets and paper sheets, respectively.

Secured to upper portions of the frame 660 are limit switches 680 and 682 having respective arms 684 and 686 adapted to be engaged by uppermost pallets and sheets of paper, respectively, in the upper ends 676 and 678 of the compartments 662 and 664, respectively. These limit switches 680 and 682 control the operation of a respective pair of gear motors 688 and 690, which drive belts 692 and 694, respectively. These belts 692 and 694 are engaged with respective pulleys 696 and 698 connected with respective sprockets 700 and 702 engaging endless chains 704 and 706, which pass over sprockets 708 and 709 near the upper ends of the compartments 662 and 664.

Secured to the chains 704 and 706 are respective pallet and paper carrying platforms 710 and 712.

It will be understood that the pulleys 696 and 698 are mounted on respective shafts 697 and 699, and that a pair of the sprockets 700 are secured to the shaft 697 and driven thereby and that a pair of sprockets 702 are secured to the shaft 699 and driven thereby; said sprockets being at opposite sides of the compartments 662 and 664, respectively, and operating respective chains 704 and 706 at opposite sides of the compartments 662 and 664 so as to support and drive opposite ends of the platforms 710 and 712 for forcing the pallets and paper sheets upwardly into contact with the arms 684 and 686 of the respective limit switches 680 and 682, which control the respective motors 688 and 690, as hereinbefore described. Thus, these motors are disposed to constantly feed wooden pallets upwardly in the compartment 662 and paper sheets in the compartment 664.

Uppermost wooden pallets 714 are thus maintained on a substantially common plane with uppermost paper sheets 716 and these pallets and sheets are held in substantially horizontal position below a movable handling frame 718, which is connected to the deck plate 74 by means of a pair of brackets 720, which traverse at opposite sides of the deck plate 74 and at opposite sides of the frame 660. Thus, the brackets 720 straddle the compartment 662 of the frame 660.

Mounted on the frame 718 are a pair of vacuumatic pickup heads 722 and 724 having their open ends directed downwardly toward the uppermost wooden pallets 714 and paper sheets 716.

The vacuumatic pickup heads 722 and 724, as shown in FIG. 43, are mounted on a horizontal member 726, which is carried by the frame 718, the frame 718 being mounted on rollers 728 and 730 at opposite sides of the machine, these rollers traversing a track member 732 suspended from the frame 62 of the machine.

A bearing bracket 734 extending downwardly on each side of the frame 718 pivotally supports a shaft 736 having a bell crank arm 738 on each opposite end, the bell crank arm carrying a cam follower roller 740 on each end of the shaft 736. Each cam follower 740 engaging a lower surface 742 of a cam member operable to pivot the shaft 736 and to actuate a bell crank lever 744 to depress the horizontal member 726 and the respective vacuum heads 722 and 724; there being a pair of the vacuum heads 722 and a pair of the vacuum heads 724; the operation of which will be more fully described hereinafter. As shown in FIG. 42, it will be seen that the cam follower roller 740, when moved in the direction of an arrow 741, will engage an abrupt downwardly directed portion 746 of the cam surface 742, causing counterclockwise rotation of the shaft 736, which causes downward pivotal actuation of the bell crank lever 744 to depress the horizontal member 726 and the vacuum heads 722 and 724 carried thereby, when the deck plate 74 moves toward the right, as shown in FIG. 42, to place the vacuum heads 722 and 724 over the uppermost pallets 714 and paper sheets 716, respectively. Thus, the vacuum heads are moved into close proximity to the upper surfaces of the pallets and paper sheets, when the deck plate has forced a course of bricks under the shaft 170 and into position over the platform 202 of the elevator 230.

As shown in FIG. 43, the horizontal member 723 is normally held adjacent to a horizontal bar 748 of the frame 718 by means of springs 750 surrounding bolts 752, which are secured to the horizontal member 726 and pass through openings 754 in the horizontal members 748. Thus, the horizontal member 726 is normally held upward in the solid line position, shown in FIG. 43, and is depressed downwardly into the broken line position 756, when the cam follower roller 740 engages the cam portion 746, shown in FIG. 42 of the drawings.

Operation of the paper and pallet handling mechanism, hereinbefore described, is illustrated diagrammatically in FIGS. 46, 47 and 48, wherein the horizontal member 726 is shown moved back and forth in unison with operation of the deck plate 74 and relative to uppermost pallets 714 and paper sheets 716. Additionally, these figures illustrate courses of bricks on the elevator 202 and the placement of pallets and paper sheets on such courses of bricks.

As shown in FIG. 46, the normal operation of the vacuum heads 722 and 724, is such that they are energized each time the deck plate moves them into position, wherein the cam 746 forces the horizontal members 726 downwardly into close proximity to the upper pallet 714 and the paper sheets 716. Each operation causes movement of a paper sheet 716 by means of the vacuum head 724 to a position above the uppermost pallet 714. Concurrently, the vacuum head 722 moves a paper sheet 716 from the upper surface of the uppermost pallet 714 to a position over a course of bricks 82 above the elevator platform 202. Thus, each paper sheet 716 is transferred first to the top of the stack of pallets and onto the uppermost pallet 714; and during the next cycle of operation, the same sheet is transferred to the top of a course of bricks 82 on the elevator platform 202.

During one cycle of operation of the deck plate 74, while forming a stack of bricks, as shown in FIG. 39, a pallet 224 at the uppermost position 714 must be picked up. Consequently, during the previous cycle, the uppermost paper sheet 716 cannot be picked up and during this cycle, the vacuumatic pickup heads 724 are de-energized for one cycle so that the uppermost pallet 714 will be exposed and bare to permit the vacuumatic pickup heads 722 to pickup the pallet and place it on the course of bricks. Thus, interruption in the operation of the vacuummatic pickup heads 722 and 724 is accomplished during one cycle preliminary to the placement of the pallet 224 on the course above the openings 220, as shown in FIG. 39, and at all other times, both the vacuumatic pickup heads 722 and 724 are operated concurrently during each cycle of operation of the deck plate 74. FIG. 47 shows the transfer of a paper sheet from the uppermost pallet 714 onto a course of bricks 82 and FIG. 48 shows a continued operating cycle in which the paper sheets are transferred first to the uppermost pallet 714 and then onto the respective courses of bricks 82 on the platform 202.

It will be understood that the vacuumatic pickup heads 722 and 724 are conventional aspirator-type vacuum heads and that solenoid valves control these vacuum heads, such that they are energized, when picking up and transferring pallets and paper, but when they reach the farthermost position to the left, as shown in FIGS. 46, 47 and 48, corresponding to the retraction of the deck plate 74, that these vacuumatic pickup heads are de-energized and thus drop the respective pallets and paper sheets, as hereinbefore described.

As shown in FIG. 39, each stack of bricks stacked on the elevator platform 202, as hereinbefore described, comprises vertically superimposed courses or rows of bricks, which form a stack which is quite tall and quite thin from one vertical side of the stack to the other vertical side, and accordingly, the machine of the invention is provided with stack guide bars, which are disposed to guide the stack of bricks on the elevator platform 202, as the elevator moves downwardly step by step in increments equal to the critical dimensions of the respective rows or courses of bricks. These guide bars prevent the tipping and disassembly of the stack, until it has finally been deposited on the carriage platform 265, as will be hereinafter described in detail.

The vertical side bars for supporting and guiding the stack of bricks on the elevator platform 202 are shown in FIGS. 2, 4, and 42, reference being had to these figures, wherein a pair of guide bars 760 extend downwardly from a horizontal portion 762 of the frame 62 at each opposite side thereof adjacent opposite ends of the shaft 170. These guide bars 760 being stationary, permits the stack of bricks on the elevator platform 202 to move downwardly therebetween and hold the stack of bricks in substantial alignment in a lateral direction with respect to the stack, as shown in FIG. 39 of the drawings. The carriage 268, as shown in FIGS. 1, 2, 4, 26, 27, 28 and 42, is provided with a plurality of upwardly directed guide bars 770, which extend upwardly from the platform 265 in slightly overlapping relation with the downwardly directed guide bars 760, hereinbefore described. On one end of the carriage 268, the guide bars 770 are rigidly mounted, while similar guide bars 774 at the opposite end of the carriage, as shown in FIG. 26, are pivotally mounted on an upwardly extending rod 776. Thus, a stack of bricks, when moved downwardly onto the carriage platform 265, may pass between the guide bars 770 and 774, which are in alignment with the guide bars 760, hereinbefore described. The tracks 272, hereinbefore described, extend laterally with respect to the frame 62 of the machine, permitting the carriage 260 to travel into an area 778 for unloading a stack of bricks from the elevator platform 265 by means not shown in the present application and which is no part of the present invention. It will be understood, however, that during the time that the carriage 265 is positioned in the area 778, that the machine of the invention keeps on stacking bricks on the elevator platform 202 and successively moves downwardly, such that the lower portion of a stack of bricks and the elevator platform may reach a level below upper ends 771 of the bars 770 of the carriage 268. Accordingly, it is necessary that one end gate of the carriage 265, on which the bars 774 are mounted, be pivoted out of the way so that it may pass the elevator platform 202 and the bricks thereon and reach a position directly below the elevator platform 202, such that the guide bars 770 and 774 may be aligned with the guide bars 760, as hereinbefore described. Accordingly, the guide bars 774, shown in FIG. 26, are mounted on a cross bar 780 which is pivoted about the axis of the shaft 776, hereinbefore described. The cross member 780 is fixed to the shaft 776 by welding, or otherwise, and a bearing boss 782 is fixed to one of the bars 774 and to the upper end of the shaft 776, as shown in FIG. 27.

Fixed to the shaft 776 is a cam arm 784 having a cam roller 786 on the extended end thereof. This roller 786 is engageable with a cam bar 788 carried by the frame 62 of the machine of the invention, all as shown best in FIGS. 26 and 27.

The cam bar 788 is provided with an incline portion 789 engageable by the roller 786. The incline 789 is adapted to operate the shaft 776 in one pivotal direction only, attention being directed to FIG. 28, in which the lever 784 is shown mounted on a quadrant 790 pivotal about the shaft 776 and having an abutment portion 792 adapted to engage an abutment portion 794 of a quadrant 796 fixed to the shaft 776. Accordingly, the lever 784, when moved in the direction of an arrow 798, will cause pivotal movement of the shaft 776 in a clockwise direction and when the lever 784 is pivoted in the opposite direction relative to the shaft 776, the quadrant portions 794 and 792 separate and the lever 784 merely pivots about the axis of the shaft 776.

As shown in FIG. 27, the quadrant portions are axially overlapped at 800 and a sleeve 802 fixed to the shaft 776 by a set screw 804 holds one end of a torsion spring 806, the opposite end 808 of which is fixed to the frame 62 by a collar 810. This torsion spring tends to rotate the shaft and the bar 774 into the solid line position, shown in FIG. 26, wherein the bars 774 are disposed in upright position at the opposite end of the platform 265 from the bars 770.

The quadrant 796 is fixed by a set screw 812 to the shaft 776 and fixed to the quadrant 796 is a stop arm 814 engageable with an end 816 of a stop screw 818 secured in a bracket 820 on the frame 62. Thus, the shaft, when rotated by the torsion spring 806, is limited in its pivotal movement so as to align the bar 780, shown in FIG. 26, substantially normal to the axes of the shaft 272 and the longitudinal axis of the platform 265 of the carriage 268.

In operation, the carriage 268, when moving toward the area 778, carries, a stack of bricks between the bars 770 and 774. The cam arm 784, when engaging the incline 789, merely pivots in the direction of the arrow 799 without tending to rotate the shaft 776.

When the carriage 268 has reached the area 778 and the roller 786 has passed an end 822 of the cam bar 788, the stack of bricks is unloaded from the platform 265 and the carriage then may be returned to the position, shown in FIG. 26. By this time, the elevator platform 202 may be in an area to interfere with upper ends of the bars 770 and, accordingly, as the roller 786 engages the end 822 of the cam bar 788, the abutment portions 794 and 792 are engaged, thereby applying torque through the quadrants 790 and 796 to the shaft 776 tending to pivot the shaft in a clockwise direction, as shown in FIGS. 26 and 28, to thus pivot the bar 780 into a position parallel with the tracks 272 and out of interference with an area of the elevator platform 202. The roller 786 then proceeds along the cam bar 788, as carriage 268 moves in the direction of an arrow 826 until the roller 786 reaches the cam portion 788 at which time, the roller 788 and arm 784 are released and permitted to pivot in a counter-clockwise direction, as indicated by the arrow 799 in FIG. 28. At this time, the torsion spring 806 returns the bar 788 and bars 774 to the solid line position, shown in FIG. 26, and at this time, the bars 774 have reached a position beyond the area of the downwardly moving elevator platform 202 and the bars 770 and 774 are again in position to receive the next successive stack of bricks being lowered on the elevator platform 202.

A tension spring 828 tends to rotate the arm 784 in a counterclockwise direction, as indicated by the arrow 798 in FIG. 28, to maintain normal engagement of the portion 792 and portion 794 of the quadrants 790 and 796. However, the tension of the torsion spring 828 is not sufficient to in any manner, effect the normal torsional operation of the spring 806 to maintain the bar 780, as shown in FIG. 26, normal to the axes of the tracks 272.

As shown in FIG. 2, a pressure fluid cylinder 830 is pivotally mounted on a pin 832 secured in a bracket 834, which is secured stationarily relative to the frame 62 and rails 272. The cylinder 830 is provided with a plunger 836, as shown in FIG. 26, which is pivotally connected by means of a clevis 838 to the carriage 268, all as indicated in FIGS. 26 and 42.

The carriage 268 is thus moved from the position, shown in FIG. 26, to the area 778 and back to the solid position, shown in FIG. 26, by extension and retraction of the plunger 836 of the cylinder 830.

Operation of the mechanism of the invention is carried out in connection with the various electrical apparatus, as shown in FIGS. 49, 50 and 51 of the drawings.

A limit switch LS1 is located above the deck plate 74 at an end of a row of bricks on the conveyor 52, as hereinbefore described. This switch contains normally open contacts, which are connected to lines 4 and 9 and provide an indication of a loaded condition of the deck plate 74. Normally closed contacts of LS1 are not used.

A limit switch LS3 is a momentary contact switch, equipped with a oneway actuator; it is located on the elevator 230 and is activated by the pole 296, and its switch actuating members 294. A normally closed side of LS3 is connected between lines 24 and 21 and a normally open side of LS3, as shown, is not used. The function of LS3 is to locate the position of the elevator for the various superimposed courses of bricks to be placed on the elevator.

A limit switch LS4 is an internal interlock switch. A normally closed side of this switch LS4 is connected between lines 11 and 17a. This switch LS4 is mounted on the elevator 230 and stops the machine to prevent the elevator from continuing downward, if the carriage 268 is loaded with a stack of bricks. The normally open side of this switch LS4 is not used.

A limit switch LS5 is located at the base of the frame 62 and is activated by the elevator 230 moving downward and is the elevator bottom position limit switch, retracts the elevator platform 202.

The normally open side of LS5 is connected between lines 4 and 28, and a normally closed side of LS5 is not used.

A limit switch LS8 is located on the frame 62 at the extreme top position of elevator travel, and is the elevator upper limit switch, this switch LS8 is activated by the elevator 230.

A normally closed side of LS8 is connected between wire 31 and wire 32. A normally open side of LS8 is not used.

LS8A is a first course control switch.

A limit switch LS6 is located midway between LS8 and LS5 and is activated by the elevator 230 to energize the cylinder 276 and to extend the elevator platform 202. A normally open side of LS6 is not used and the normally closed side of LS6 is connected between wires 28 and 29.

A limit switch LS7 is located on the elevator 230, and is activated by the elevator platform 202 upon its retracting movement. The normally closed side of LS7 is not used, and the normally open side thereof is connected between wires 4 and 31. When activated, LS7 causes the elevator 230 to rise.

A limit switch LS10 is located above the pallet feed mechanism, and is actuated by the feed mechanism stripping plate solenoid 598. The normally closed side of LS10 is connected between wires 37 and 37, and uncouples the pallet feed controlling air valve, as will be hereinafter described.

The normally open side of LS10 is connected between lines 4 and 38 and couples the pallet feed stripping plate solenoid.

A limit switch LS11 is located on a ram assembly for unloading the carriage 268 and the limit switch LS11 is equipped with a oneway actuator. The said ram assembly is not shown in the drawings, and is no part of the present invention.

A normally open side of LS11 is not used and the normally closed side of this switch LS11 is connected between lines 40 and 41 and is pulsed momentarily, as the plunger of the ram assembly returns.

A limit switch LS13 is mounted on the storey pole 296 in a position, where openings 220 occur in a course of bricks, as shown in FIG. 39. A normally open side of LS13 is connected between lines 4 and 44, and a normally closed side of LS13 is not used.

A limit switch LS14 is located on the frame 62 of the machine at a position corresponding with the extreme travel of the plunger 78, and this switch is actuated by the deck plate 74, when extended and, thus, provides an indication that the deck plate has been extended. A normally open side of LS14 is connected between lines 4 and 45 to energize 3TR, which retracts the deck and lowers the elevator. The normally closed side of this switch LS14 is connected between lines 4 and 55 in an alarm circuit to reset the alarm time, as will be hereinafter described.

A limit switch LS15 is located on the frame 62 and is actuated by the deck plate 74 on its return stroke upon retraction of the plunger 78. LS15 is connected between lines 4 and 47 and prevents the input conveyor 52 from starting until the deck plate is fully retracted. A normally open side of LS15 is not used.

Limit switches LS17 and LS18 are connected in parallel, LS17 is activated by the carriage 268 in the position, shown in FIG. 26. LS18 is activated by the elevator 230. Both switches LS17 and LS18 are connected across lines 17a and 23. These switches stop the machine to prevent the elevator 230 from continuing downward, if the carriage 268 is not aligned thereunder, the normally open sides of the two switches are not used.

A limit switch LS19 is the paper feed program switch. This switch is mounted on the elevator 230. A normal open side of LS19 is connected to lines 80 and 81, the normally closed side of LS19 is not used.

A limit switch LS20 is maintained in contact switch connected between wires 83 and 86, and is activated by the motion of the deck plate to energize the pallet and paper feed.

LS21 controls the block holding clamp means 300 of the modified invention.

Abbreviations of terms contained herein, are defined as follows:

LS designates a limit switch.
AV designates an air valve.
S designates a solenoid.
SW designates a manually operable switch.
CR designates a control relay.
TR designates a timer relay.
ESCR designates an emergency stop control relay.
MID designates motor I down (elevator).
MIU designates motor I up (elevator).
IL designates an indicating light.

The general operation of the air valves of the invention are, as follows:

AV1 operates the deck plate actuating cylinder 79.
AV2 operates the side shift cylinder 158.
AV3 operates the elevator platform actuating cylinder 276.
AV4 operates the pallet feed cylinder 588.
AV5 operates the carriage actuating cylinder 830.
AV6 operates the paper feed vibrator 563.
AV7 operates the paper feed vacuum heads 650.
AV8 is the main line shutoff valve for the pneumatic system of the invention.
AV9 controls the operating cylinder for the block clamp.

General operation of the solenoids is, as follows:

S1 operates the stripping plate 592.

S2 operates the latch lever 204 for holding the gate members 176 and the shaft 170 in fixed position, as hereinbefore described.

S3 operates the paper feed gate mechanism 626.

The following is the general electrical sequence of operation of the machine of the invention, including the electrical equipment, as it relates to other means of the invention.

With reference to FIGS. 49, 50 and 51, it will be seen that a control panel switch SW1 may be actuated, which energizes the main power bus, with SW2 in the off position. An indicator light IL1 will indicate the power on and will be illuminated and a control relay CR7 will be energized and the primary transformer of a relay 1TR will be energized, allowing this electronic relay to warm up and after a given amount of time, uncouple. Additionally, when SW3 is in the on position, the elevator motor circuit of the machine will be energized. The operator may then place SW2 on manual position and depress a push button 5 and thereby place the elevator 230 in a position below the last course actuator member 294 on the storey pole 296. This will cause the closing of LS3. SW2 is then set to automatic position, and this energizes the automatic bus which will energize 4TR, the alarm circuit timer, then operate push button 4, which will energize 5TR, opening up its contacts between lines 9 and 9a, uncoupling 1CR and resetting 4TR. The operator may then depress push button 2, the automatic start button, which will couple ESCR and ESCR will energize 2CR. 2CR will energize MID, causing the elevator 230 to lower. The elevator will lower until it actuates LS5, which will couple 3CR. 3CR holds itself in the energized position and energizes AV3. AV3 operates the elevator platform actuating cylinder 276 and this actuating cylinder 276 retracts the elevator platform and operates LS7, which couples 4CR. 4CR energizes MIU, causing the elevator 230 to rise The elevator 230 then raises until it operates LS6, which will uncouple 3CR, causing AV3 to be de-energized, and thereby extending the plunger of the cylinder 276 and the elevator platform 202. The elevator 270 will then continue to rise until it actuates LS8 and LS8A. LS8 will uncouple 4CR, which will cause the elevator 230 to stop. LS8A will uncouple 2CR, so the elevator will remain at its upper limit and first brick course position.

When the automatic stop push button originally coupled to ESCR, M2 and M3, are energized and causes the conveyor 52 to fill the deck plate 74, and thereby closing LS1.

When 2CR is de-energized, LS1 causes 1CR to latch, closing contacts on line 10 to air valve 1, causing the deck plate 74 to be extended toward the shaft 170.

When the deck plate 74 is extended, it actuates LS14 energizing 3TR, unlatching 1CR, de-energizing AV1, and thereby causing the deck plate 74 to be retracted.

3TR times closed, after de-energizing on line 15, thereby energizing 7CR.

7CR closes on line 17, and energizes 1TR. 7CR also closes on line 19, energizing 2CR bypassing LS3 and LS8A, which in turn energizes MID.

1TR times open after LS8A is operated at top position and LS3 is operated on all other positions, as the elevator 230 is dropped.

The elevator will continue to drop until LS3 contacts an actuator 294 for the next position of the elevator, thus, opening LS3, and de-energizing 2CR. 2CR uncouples MID causing the elevator 230 to stop.

When 1CR is unlatched and LS15 is closed by the deck plate 74, when retracted, the conveyor 52 starts filling the deck plate 74 with a row of bricks, which causes the row of bricks ultimately to actuate LS1 and stop the conveyor 52, then the process repeats.

The process continues until 10 courses, for example, have been stacked on the elevator platform 202, at which time the elevator continues on down, depositing the stack of bricks on the carriage 268 and actuates LS5. LS5 energizes 3CR, which locks itself in circuit.

3CR causes the platform 202 to retract, by actuating air valve 3. The carriage 268 extends to the off loading position 272, shown in FIG. 46, this being accomplished by activation of the air valve 5. The air valve 5 is activated by the platform 202, retracting through LS7, energizing 4CR which energizes 2TR and MIU.

Air valve 4 is energized by 3CR, causing cylinder 588 to extend and raises the pallet feed magazine plate 584, impaling a pallet and operating LS10, coupling solenoid 1 and de-energizing air valve 4.

The extending of the carriage 268 by the cylinder 830 actuates a limit switch, which energizes the unloading ram, not a part of this invention, starting it to cycle.

The return stroke of the unloading ram causes momentary interruption of the contacts on LS11, uncoupling 2TR, causing AV5 to be de-energized, returning the carriage 268 to the position, shown in FIG. 26.

At the second position, normally the course prior to forming openings 220, shown in FIG. 39, LS9 is opened so that when the deck plate 74 is extended, LS14 energizes 3TR, and uncouples 3TR de-energizing solenoid 1 and feeding a pallet onto the carriage 566.

At the third position, where the opening 220 is normally formed, LS13 is closed, energizing 5CR. 5CR energizes solenoid 2, which restricts pivotal movement of the shaft 170 and the gate members 176. This is done by means of the latch bar 204, hereinbefore described.

The gate members 176 are restricted at this course, so as to allow only certain bricks to pass therethrough, and to thereby provide for the formation of the openings 220 in the course of bricks, as shown in FIG. 39.

Also, at the third position, when the deck plate 74 is extended, LS14 is actuated, causing contacts on line 38 to energize 3TR. Then 3TR instantaneous contacts are closed, causing AV2 to be energized, side shifting the two bricks on the plate 130 in center course of the row of bricks 82.

This function occurs, as hereinbefore described, in connection with FIG. 33, and particularly course A, using the 2¼ inch thick bricks.

When 3TR times out, 1CR is uncoupled, causing the deck plate 74 to retract. 3TR contact also close across wires 2 and 17, energizing 7CR. Also, 3TR contacts line 11 open, de-energizing air valve 2, returning the side shift plate 134 to the position, shown in FIG. 3.

2CR is then energized to 7CR, the elevator moves downwardly, 1TR times open and LS3 allows the elevator 230 to continue to move downwardly until LS3 is opened by an actuator 294 on the storey pole 296 in a fourth position.

This cycle continues through the fourth, fifth, sixth, seventh, eighth, ninth and tenth courses.

After the tenth course, the elevator 230 continues to move downwardly, since LS3 is not opened and until the elevator actuates LS5, thus, completing the cycle.

If the paper feed is desired, SW4 on line 50 is closed and the paper feed mechanism is actuated through LS8A on the first course and LS19 on subsequent courses. LS19 is operated by the storey pole member 294 for the paper feed, in this manner.

LS8A on its normally closed contacts, takes the place of LS3, when the elevator is at the first course position. LS8A on its normally open contacts, takes the place of LS19, when the elevator is in the first course position.

If LS19 is closed and 4CR is de-energized, 8CR will be energized, closing its contacts, energizing solenoid 3, which opens the gate 626 on the paper feed magazine. 8CR also energizes across wires 81 and 83 on line 53, as the deck plate 74 extends, LS20 is closed, energizing AV7, causing a vacuum through the vacuum heads 650 for picking up paper.

As the air valve operates, LS20 is opened, de-energizing the air valve 7, and, thus, causing the vacuum to be released in the heads and the dropping of paper onto the paper sheet tray 566.

To prevent LS19 from operating, while the conveyor 320 is raised, 4CR contacts open, de-energizing 8CR, but closes to energize AV6, which operates a magazine vibrator feed 536.

The alarm cycle is operated by LS14, by de-energizing 4TR each time the deck plate 74 is extended. If 4TR is not de-energized at least every 30 seconds, 4TR time closed contacts on line 43 will close, illuminating 1L3 and sounding the horn on line 42. A push button 3 may be depressed to couple 6CR, opening its contacts on line 42, so that the horn will be silent. However, 1L3, the red warning light, will continue to remain on until the situation has been corrected, thereby resetting 4TR.

It will be obvious to those skilled in the art that various modifications of the present invention may be resorted to in a manner limited only by a just interpretation of the following claims.

We claim:

1. In a brick stacking machine, the combination of: a conveyor; a frame; a deck plate having an elongated brick receiving portion movably mounted on said frame and disposed to receive bricks from said conveyor; conveyor control means disposed to interrupt operation of said conveyor when a row of bricks has been forced onto said deck plate from said conveyor; first actuating means for moving said deck plate back and forth laterally relative to said elongated brick receiving portion thereof; spaced pusher members carried by said deck plate and extending upwardly therefrom and engageable with vertical surfaces of bricks on said deck plate, said pusher members spaced apart longitudinally along said elongated brick receiving portion of said deck plate, such that some preselected bricks of said row are not engageable by said pusher members, but said preselected bricks are only frictionally carried and supported on said deck plate; gate means having a plurality of spaced gate portions disposed in a gate row, said gate row substantially parallel to and normally spaced laterally from said elongated brick receiving portion of said deck plate, when said deck plate, is disposed to receive bricks from said conveyor; movable means of said gate means disposed to support and actuate said gate portions into and out of interference with bricks on said deck, said spaced gate portions carried by said movable means and extendible into and out of interferring relation with bricks on said deck plate; all of said spaced gate portions movable out of interference with bricks on said deck plate to permit all of said row of bricks to be forced past said gate portions during movement of said deck plate in one direction by said first actuating means; second means disposed to hold all of said spaced gate portions in interfering relation with said bricks, when said deck plate is moved in a direction opposite said one direction; third means disposed to hold, in fixed positions, some of said spaced gate portions aligned between said spaced pusher members; said third means disposed to position last mentioned spaced gate portions in fixed interfering alignment with said preselected bricks disposed in said row of bricks and said third means, thus, holding said gate portions in alignment between said pusher members, whereby during one back and forth cycle of operation of said deck plate, said preselected bricks are prevented from passing said gate portions and said deck plate slides under said preselected bricks, while they are bypassed by said pusher members; and a bar extending over said deck plate, said bar being substantially parallel with said elongated brick receiving portion and disposed at an opposite side thereof from said gate portions, whereby movement of said deck plate in a direction away from said gate portions and toward said bar carries said last mentioned preselected bricks into engagement with said bar, whereupon they are engaged by additional oncoming bricks moving onto said deck plate from said conveyor and, thus, said last mentioned preselected bricks become members of a subsequent row of said bricks to operate said conveyor control means.

2. In a brick stacking machine, the combination of: a conveyor; a frame; a deck plate having an elongated brick receiving portion and movably mounted on said frame and disposed to receive bricks from said conveyor; switch means disposed to be engaged by bricks for interrupting operation of said conveyor, when a row of contiguous bricks has been forced onto said deck plate from said conveyor; first actuating means for moving said deck plate back and forth laterally relative to said elongated brick receiving portion; spaced pusher member carried by said deck plate and extending upwardly therefrom and engageable with vertical surfaces of bricks on said deck plate; said pusher members paced apart longitudinally plate; said elongated brick receiving portion of said deck plate, such that some preselected bricks of said contiguous row are not engaged by said pusher members, such said preselected bricks are frictionally carried and supported on said deck plate; gate means having a plurality of first and second gate members; a shaft disposed above a normal level of bricks on said deck plate; the axis of said shaft substantially parallel to and disposed adjacent said elongated brick receiving portion of said deck plate; said gate members pivotally mounted about the axis of said shaft and extending downwardly into interferring relation with bricks on said deck plate; all of said gate members freely pivotal in one direction about the axis of said shaft to permit all of said row of bricks to be forced thereunder by movement of said deck plate in one direction by said first actuating means; gate stop means disposed to lock all of said gate members against pivotal movement in a direction opposite to said one direction and disposed to lock all of said gate members in interferring relation with said bricks, when said deck plate is moved in a direction opposite said one direction of said deck plate; and gate latch means disposed to lock only said first gate member aligned between said spaced pusher members; said gate latch means disposed to lock said shaft preventing said first members against rotation about said shaft axis and in interferring alignment with said preselected bricks disposed in said contiguous row and located between said pusher members, whereby during one back and forth cycle of operation of said deck plate, said preselected bricks are prevented from passing under said shaft by said first gate members and said deck plate slides under said preselected bricks, while they are bypassed by said pusher members, and whereby subsequently said last mentioned preselected bricks are engaged by additional bricks moving onto said deck plate from said conveyor, and, thus become part of a subsequent row of contiguous bricks to actuate said switch means.

3. The invention, as defined in claim 1, wherein: an elevator is disposed below said deck and movably mounted to travel up and down relative to said frame; elevator actuator means disposed to move said elevator up and down; means disposed to control vertical movement of said elevator in a plurality of spaced increments equal to a vertical dimension of said bricks; said elevator disposed below a row of bricks retained by said gate portions, when held by said second means and during retraction of said deck plate toward said bar and from a position beneath said bricks, whereby they are deposited on said elevator.

4. The invention, as defined in claim 3, wherein: said elevator is provided with a horizontal brick carrying platform comprising a plurality of horizontally spaced fingers; and a brick stack carriage having a horizontal brick carrying platform comprising a plurality of horizontally spaced fingers between which the spaced fingers of said elevator platform may pass in a vertical direction; and means permitting said fingers of said elevator platform to pass to a position below said fingers of said carriage platform to thereby unload a stack of bricks from said elevator onto said carriage.

5. The invention, as defined in claim 4, wherein: means is provided for moving said carriage platform horizontally away from a position in vertical alignment with said elevator platform.

6. The invention, as defined in claim 3, wherein: a pallet deck is reciprocally mounted to move back and forth in the same horizontal direction, as said deck plate, said pallet deck is disposed on a plane spaced above said deck plate a distance greater than the elevation of said bricks; means disposed to move said pallet deck in the same directions concurrently with said deck plate; and rake means disposed to rake a pallet from said pallet deck onto a row of bricks supported on said elevator platform.

7. The invention, as defined in claim 3, wherein: a paper sheet magazine is mounted on said frame and disposed above a level of said pallet deck, said magazine being provided with an open end adapted partially to expose flat sides of sheets of paper therein; and a vacuummatic pick-off means comprising a reciprocal carriage mounted on said frame to move toward and away from said magazine; vacuum nozzles pivoted on said reciprocal carriage on a horizontal axis and means on said reciprocal carriage disposed to swing said nozzles upward into close proximity to an exposed flat side of one of said sheets of paper in said magazine, when said carriage is moved toward said magazine and said last mentioned means disposed to swing said vacuum nozzles downwardly, when said reciprocal carriage is moved away from said magazine; and further means disposed to interrupt vacuum at said nozzles, when they are swung downwardly to release said sheet of paper and to deposit it on top of a row of said bricks over said elevator platform.

8. The invention, as defined in claim 6, wherein: a pallet magazine is disposed on said frame and adapted to contain a plurality of pallets having surfaces generally corresponding in dimensions to the top of a row of said blocks; and pallet handling means adapted to deposit one of said pallets on said pallet carriage, when said pallet carriage is moved into a position farthest from said bar.

9. The invention, as defined in claim 8, wherein: said pallet magazine is provided with a vertically movement pallet support adapted to contain a stack of substantially flat pallets with their sides in horizontal position; means for moving said pallet support upwardly; impaling means having a plurality of downwardly directed spikes supported by said frame in a position above said pallet support and above a level of said pallet deck, whereby an uppermost pallet of said stack may be impaled on said spikes by upward movement of said pallet support; and an ejector means disposed to force said impaled pallet downwardly off said spikes and onto said pallet deck.

10. The invention, as defined in claim 8, wherein: said pallet magazine is provided with a vertically movable pallet support adapted to contain a stack of substantially flat pallets with their sides in horizontal position; means for moving said pallet support upwardly; suspending means supported by said frame in the position above said pallet support and above a level of said pallet deck, whereby an uppermost pallet of said stack may be suspended by said suspending means following upward movement of said pallet support; and means for releasing said pallet from said suspending means and depositing said pallet on said pallet deck.

11. The invention, as defined in claim 1, wherein: said elongated brick receiving portion is provided with a shifting portion, said shifting portion being moved longitudinally of said brick receiving portion to shift some of said bricks of a row of bricks a distance equal to a partial dimension of one brick to compensate for bricks of varying dimensions and to align said shifted bricks centrally in a path between said preselected bricks after passing said gate portions; and power operated means for actuating said shifting portion.

12. The invention, as defined in claim 2, wherein: said shaft is pivotally mounted about said horizontal axis relative to said frame, said gate latch means comprising means for fixing said first gate members and releasably holding said shaft against pivotal movement relative to said frame in said one direction, said second gate members pivotally mounted on said shaft to pivot in said one direction; and means of said gate stop means disposed to prevent pivotal movement of said second gate members relative to said shaft in an opposite direction.

13. The invention, as defined in claim 2, wherein: a pair of clamp members are pivotally supported by said frame in stationary position thereon and are disposed to move toward each other in a direction normal to the direction of movement of said deck plate, said clamping members being spaced apart a distance slightly greater than the length of said row of contiguous bricks; clamp actuating means for forcing said clamping members together forcefully to engage opposite ends of said row of bricks for holding them at substantially a position as established by an upper surface of said deck plate and for holding said row of bricks in such position, when said deck plate is moved in said opposite direction; and elevator disposed below the level of said deck plate and below said clamping members and movable up and down relative to said frame and disposed to receive rows of bricks from said clamping members, said clamp actuating means disposed to release said row of bricks vertically onto said elevator to thereby avoid tipping and displacement of said rows of bricks out of alignment with each other, when said deck plate is moved in said opposite direction.

14. The invention, as defined in claim 13, wherein: said elevator is provided with actuating means disposed to move said elevator up and down; means disposed to control vertical movement of said elevator in a plurality of spaced increments equal to a vertical dimension of said bricks; said elevator disposed below a row of bricks retained by said clamping members; said elevator having a horizontally disposed brick carrying platform comprising a plurality of horizontally spaced fingers; and a brick stack carriage having a horizontal brick carrying platform comprising a plurality of horizontally spaced fingers between which the spaced fingers of said elevator platform may pass in a vertical direction; and means permitting said fingers of said elevator platform to pass to a position below said fingers of said carriage platform to thereby unload a stack of bricks from said elevator platform onto said carriage platform.

15. The invention, as defined in claim 3, wherein: a pair of relatively movable clamp members are positioned above said elevator and disposed to clamp together against opposite ends of a contiguous row of said bricks, when retained by said gate portions for holding said row of bricks in juxtaposed elevation to prevent tipping or displacement of said bricks, when said deck plate is retracted in said opposite direction from a position beneath said bricks; and means for releasing said clamp members to deposit said row of bricks on said elevator.

16. The invention, as defined in claim 3, wherein: a pair of magazines are disposed at an opposite side of said gate members from said conveyor, said magazines being adapted to support sheets of paper and substantially thicker pallets, said magazines having structure for forcing stacks of said paper and pallets upwardly and for holding such paper and pallets in substantially horizontal position; means connected with said deck plate for carrying a pair of vacuummatic pickup nozzle assemblies back and forth in unison with the sliding movement of said deck plate and to positions over said magazines for picking up paper and pallets therefrom; and cam means for moving said vacuummatic pickup means downwardly, when said deck plate moves in said one direction to force said vacuummatic pickup means into close proximity with uppermost sheets of paper and pallets in said magazines, whereby a pallet and/or paper sheet may be picked up from the upper surfaces of said magazines, when said deck plate is moved in said one direction and whereby said vacuummatic pickup means carries said paper sheets and pallet members in said opposite direction in unison with movement of said deck plate to thus carry said paper and pallet members into a position directly over a row of bricks on said elevator; and means for actuating said vacuummatic pickup means to release said paper and pallet above said row of bricks on said elevator.

17. The invention, as defined in claim 16, wherein: said magazines are spaced from each other in a direction of the movement of said deck plate and wherein said vacuummatic pickup assemblies are also spaced in said same direction, such that one of said vacuummatic pickup assemblies is disposed over the magazine farthest from said gate means, when said deck plate is moved in said one direction and the other of said vacuummatic pickup is disposed over the magazine nearest said gate means, whereby the vacuummatic assemblies disposed over said magazine farthest from said gate assembly may transfer a sheet from said magazine to the top of the magazine nearest said gate assembly, and subsequently, the other of said vacuummatic pickups may relay said last mentioned sheets from said magazine nearest said gate assembly to a position over a row of bricks on said conveyor.

18. The invention, as defined in claim 17, wherein: means is provided for constantly feeding said paper sheets and pallets upwardly in said magazine and limit switch means for maintaining the uppermost of said paper sheets and pallets at a predetermined level, whereat said vacuummatic pickup means may be closely positioned with relation thereto by said cam means.

19. In a brick stacking machine, the combination of: a conveyor; first means for receiving a row of bricks from said conveyor; an elevator disposed in spaced relationship to said first means; power means for moving said row of bricks over said elevator second means for transferring the said row of bricks onto said elevator; means for preventing the movement of some of said bricks in said row to thereby form openings therein, as they are moved from said first means to said elevator; and third means for placing a supporting member above said openings to support a superimposed row of bricks thereabove.

References Cited
UNITED STATES PATENTS

| | | | |
|---|---|---|---|
| 732,221 | 6/1903 | Potvin | 214—6 |
| 2,703,182 | 3/1955 | Broberg et al. | 214—6 |
| 3,037,644 | 6/1962 | Segur | 214—6 |
| 3,095,678 | 7/1963 | Cliff et al. | |

FOREIGN PATENTS

| | | |
|---|---|---|
| 903,440 | 8/1962 | Great Britain. |

ROBERT G. SHERIDAN, *Primary Examiner.*

R. J. SPAR, *Assistant Examiner.*